US011900521B2

United States Patent
Braff et al.

(10) Patent No.: US 11,900,521 B2
(45) Date of Patent: Feb. 13, 2024

(54) VIRTUAL WINDOW APPARATUS AND SYSTEM

(71) Applicant: LiquidView Corp, San Rafael, CA (US)

(72) Inventors: Mitchell Braff, San Rafael, CA (US); Jan C. Hobbel, San Rafael, CA (US); Paulina A. Perrault, San Rafael, CA (US); Adam Sah, San Rafael, CA (US); Kangil Cheon, San Francisco, CA (US); Yeongkeun Jeong, San Francisco, CA (US); Grishma Rao, San Francisco, CA (US); Noah Michael Shibley, San Francisco, CA (US); Hyerim Shin, San Francisco, CA (US); Marcelle van Beusekom, San Francisco, CA (US)

(73) Assignee: LiquidView Corp, San Rafael, CA (US)

(*) Notice: Subject to any disclaimer, the term of this patent is extended or adjusted under 35 U.S.C. 154(b) by 130 days.

(21) Appl. No.: 17/404,917

(22) Filed: Aug. 17, 2021

(65) Prior Publication Data

US 2022/0051465 A1 Feb. 17, 2022

Related U.S. Application Data

(60) Provisional application No. 63/209,510, filed on Jun. 11, 2021, provisional application No. 63/066,675, filed on Aug. 17, 2020.

(51) Int. Cl.
*G06T 13/60* (2011.01)
*G06F 3/147* (2006.01)
(Continued)

(52) U.S. Cl.
CPC .............. *G06T 13/60* (2013.01); *G06F 3/147* (2013.01); *G09G 5/003* (2013.01); *H04N 7/183* (2013.01); *G09G 2380/16* (2013.01)

(58) Field of Classification Search
CPC .... G03F 7/115; G09G 2380/16; G09G 5/003; G06F 3/147
See application file for complete search history.

(56) References Cited

U.S. PATENT DOCUMENTS

| 5,251,392 A | 10/1993 | McManigal |
| 5,426,879 A | 6/1995 | Hecker |

(Continued)

FOREIGN PATENT DOCUMENTS

| CN | 103813115 A | 5/2014 |
| CN | 105205091 A | 12/2015 |

(Continued)

OTHER PUBLICATIONS

ATMOPH , "Atmoph Window 2", https://atmph.com/en/products/aw102, 27.

(Continued)

*Primary Examiner* — Ming Wu
(74) *Attorney, Agent, or Firm* — Perkins Coie LLP; Michael Glenn; Vikram Iyengar

(57) ABSTRACT

An apparatus includes an electronic display configured to be positioned in a first location and one or more processors electronically coupled to the electronic display. The processors receive a video from a server. The video depicts a view of a second location and includes an image of a rectangular casing, a frame, and one or more muntins. The image is composited with the video by the server to provide an illusion of a window in the second location to a user viewing the video. The rectangular casing surrounds the window. The processors synchronize a time-of-view at the second loca- (Continued)

tion in the video with a time-of-day at the first location and synchronize a second length-of-day at the second location in the video with a first length-of-day at the first location. The processors transmit the video to the electronic display for viewing by the user.

20 Claims, 22 Drawing Sheets

(51) Int. Cl.
*G09G 5/00* (2006.01)
*H04N 7/18* (2006.01)

(56) References Cited

U.S. PATENT DOCUMENTS

| | | | |
|---|---|---|---|
| 6,152,563 | A | 11/2000 | Hutchinson et al. |
| 6,166,744 | A | 12/2000 | Jaszlics et al. |
| D465,489 | S | 11/2002 | Farber |
| 6,504,990 | B1 | 1/2003 | Abecassis |
| 7,039,478 | B2 | 5/2006 | Ledoux et al. |
| 7,432,940 | B2 | 10/2008 | Brook et al. |
| 7,796,155 | B1 | 9/2010 | Neely et al. |
| 9,013,505 | B1 | 4/2015 | Thornton |
| 9,197,918 | B2 | 11/2015 | Li et al. |
| 9,330,478 | B2 | 5/2016 | Anderson |
| 9,342,467 | B1 | 5/2016 | Mcgrath et al. |
| 9,485,459 | B2 | 11/2016 | Shoemake et al. |
| 9,582,762 | B1 * | 2/2017 | Cosic .................... G06V 20/00 |
| 9,781,538 | B2 | 10/2017 | Gomez |
| 10,008,238 | B2 | 6/2018 | Waterston et al. |
| 10,075,758 | B2 | 9/2018 | Ayers et al. |
| 10,466,957 | B2 | 11/2019 | Kraft et al. |
| 11,184,303 | B2 * | 11/2021 | Deac ..................... H04L 51/212 |
| 2002/0032546 | A1 | 3/2002 | Imamura et al. |
| 2005/0035980 | A1 | 2/2005 | Lonsing |
| 2005/0044511 | A1 | 2/2005 | Jong |
| 2005/0047629 | A1 | 3/2005 | Farrell et al. |
| 2005/0280706 | A1 | 12/2005 | Jong |
| 2007/0244384 | A1 | 10/2007 | Gore |
| 2008/0088624 | A1 | 4/2008 | Long et al. |
| 2009/0273302 | A1 | 11/2009 | Staats et al. |
| 2012/0050570 | A1 | 3/2012 | Jasinski et al. |
| 2012/0200756 | A1 | 8/2012 | Church |
| 2014/0193039 | A1 * | 7/2014 | Wexler ...................... E06B 7/16 |
| | | | 382/106 |
| 2015/0319429 | A1 | 11/2015 | Lapstun |
| 2016/0227295 | A1 | 8/2016 | Casey et al. |
| 2017/0087465 | A1 | 3/2017 | Lyons et al. |
| 2017/0347129 | A1 | 11/2017 | Levi et al. |
| 2018/0068170 | A1 | 3/2018 | Kohlmeier-Beckmann |
| 2018/0095541 | A1 | 4/2018 | Gribetz et al. |
| 2018/0343441 | A1 | 11/2018 | Posa et al. |
| 2019/0320163 | A1 | 10/2019 | Posa et al. |
| 2019/0356865 | A1 * | 11/2019 | Basso ....................... G09F 9/35 |
| 2020/0073617 | A1 | 3/2020 | Huang et al. |
| 2020/0186716 | A1 * | 6/2020 | Tanaka ............... H04N 23/6815 |

FOREIGN PATENT DOCUMENTS

| | | |
|---|---|---|
| CN | 110519491 A | 11/2019 |
| CN | 112204993 A | 1/2021 |
| JP | H09205602 A | 8/1997 |
| JP | 2004183318 A | 7/2004 |
| JP | 5409577 B2 | 2/2014 |
| RU | 2610404 C2 | 2/2017 |
| WO | WO 2018/232050 | 12/2018 |
| WO | WO 2018/232050 A1 | 12/2018 |
| WO | WO-2018220405 A1 * 12/2018 ............. G01R 31/40 |

OTHER PUBLICATIONS

Mack Anthony, "Virtual Windows and Skylights", http://www.windways.org/personal_page/virtual_windows/, 18.

Sky Factory, "Virtual windows with the dynamic beauty of natural landscapes", https://www.skyfactory.com/products/eScape/, 5.

SkyView, "SkyView! A Biophilic Portal of Beauty & Wholeness The World's 1st Virtual Skylight with Feature-length Scenes", https://www.skyfactory.com/products/SkyView/, 5.

Twisted Sifter, "No Windows? No Problem! Virtual Windows by Winscape", https://twistedsifter.com/2010/04/winscape-virtual-windows/, Apr. 19, 2010, 9.

* cited by examiner

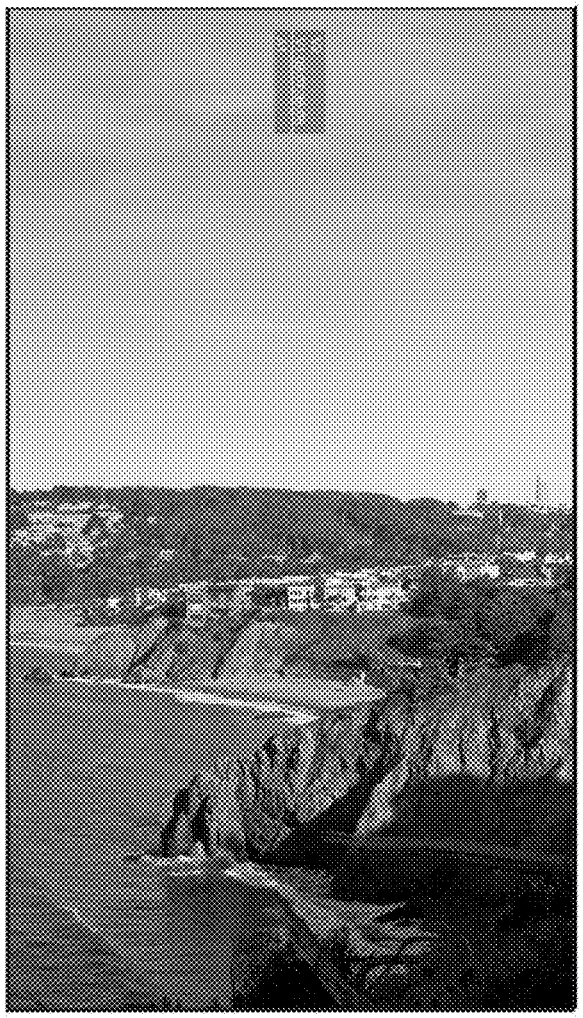 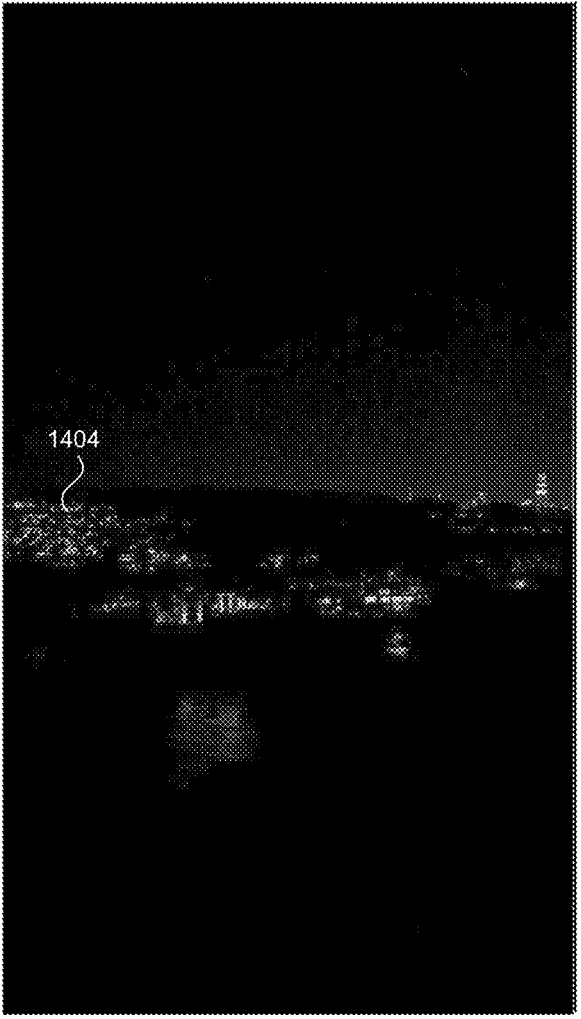
*FIG. 14A*  *FIG. 14B*

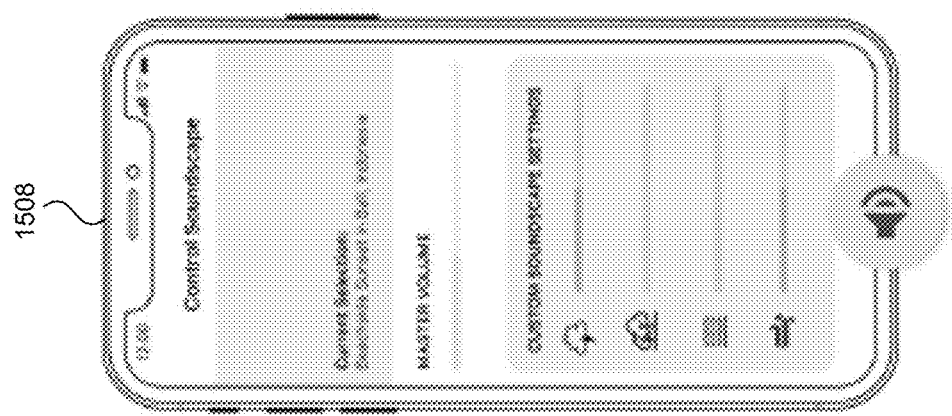
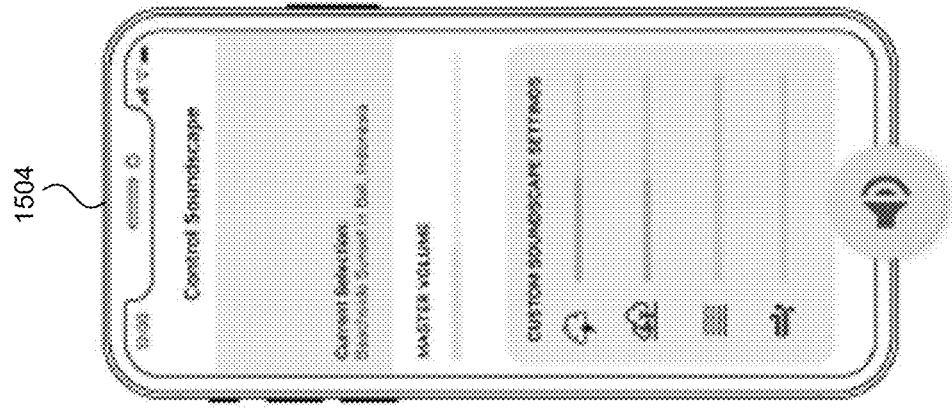
FIG. 15

VIRTUAL WINDOW APPARATUS AND SYSTEM

CROSS-REFERENCE TO RELATED APPLICATIONS

This application claims the benefit of U.S. Provisional Patent Application No. 63/066,675, filed Aug. 17, 2020 and U.S. Provisional Patent Application No. 63/209,510, filed Jun. 11, 2021, both of which are incorporated by reference in their entireties herein.

FIELD OF THE INVENTION

This description relates generally to realistic simulation of geographic locations and specifically to virtual window apparatuses and systems.

BACKGROUND

Some indoor and even outdoor spaces have no source of natural light. That is, there may be no windows in such spaces, e.g., basements, conference rooms, partially enclosed patios, bathrooms, or business lobbies that have no access to windows. As such, these spaces can seem confining. Further, in some locations, even if there is natural light, a nice or pleasing view is not available, e.g., urban areas with high density or spaces next to buildings.

SUMMARY

Apparatus and systems for virtual window apparatuses and systems are disclosed.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 14A illustrates an example day view of a particular area displayed using a virtual window, in accordance with one or more embodiments.

FIG. 14B illustrates an example night view of the particular area displayed in FIG. 14A, in accordance with one or more embodiments.

FIG. 15 is a block diagram illustrating an example system for generating soundscapes, in accordance with one or more embodiments.

DETAILED DESCRIPTION

Figure 1:
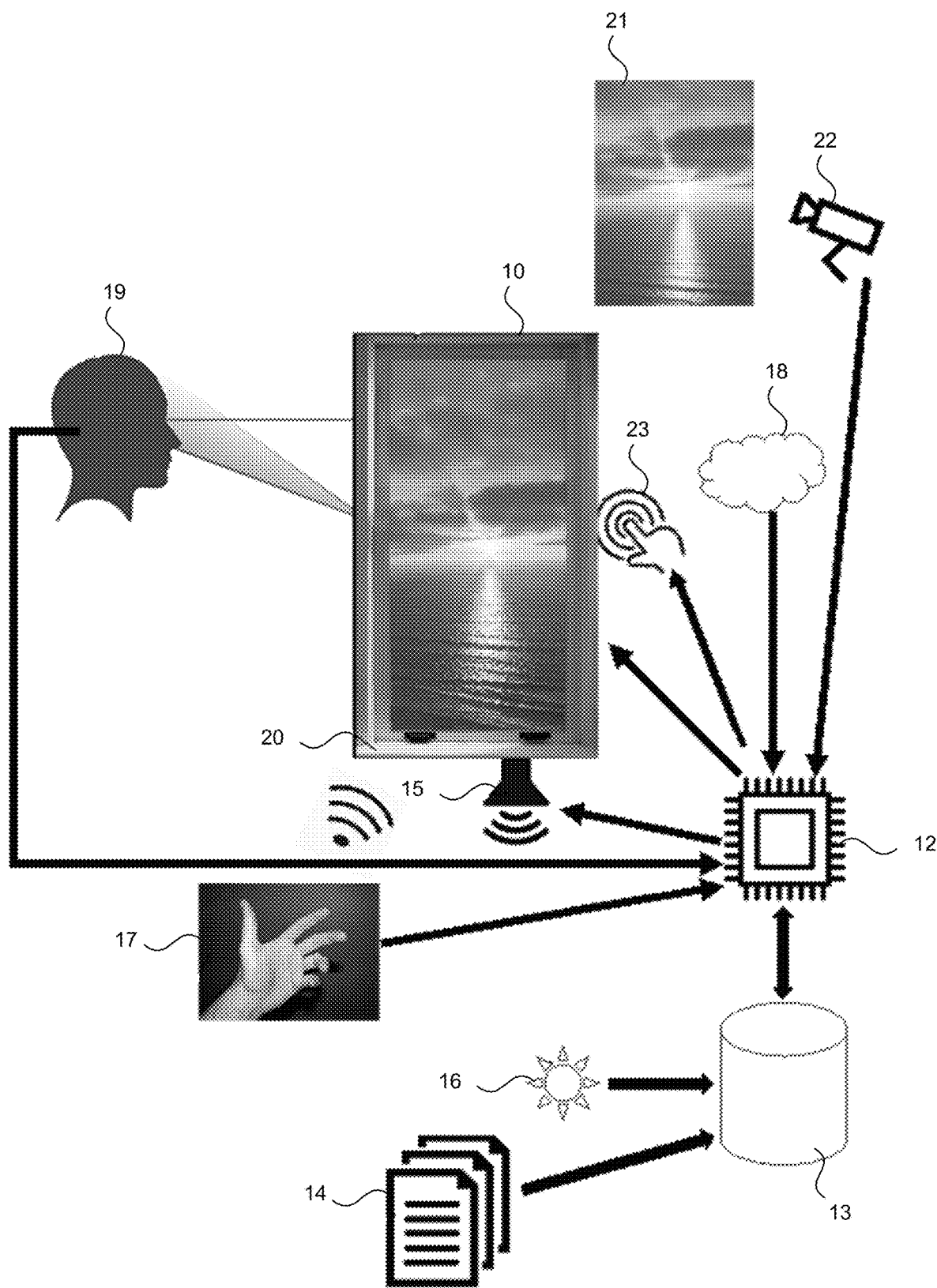
FIG. 1 is a block diagram illustrating an example system for generating views from virtual windows, in accordance with one or more embodiments.

In the following description, for the purposes of explanation, numerous specific details are set forth in order to provide a thorough understanding of the present embodiments. It will be apparent, however, that the present embodiments can be practiced without these specific details.

This document presents systems and apparatus for virtual windows. In some embodiments, a video is received from a camera or a computer device. The video depicts a view of a first location. An image of a virtual casing, a virtual frame, or (optionally) muntins or mullions can be generated. The image is composited with the video to provide an illusion of a window in the first location to a user viewing the video. The user is located in a second location. The video is displayed on an electronic display located at the second location for viewing by the user. In other embodiments, an electronic display is configured to be either mounted on a wall in a first location, fully portable, attached to other objects, or itself part of another device in the first location. One or more processors are electronically coupled to the electronic display and configured to receive a video from a server. The video depicts a view of a second location and is composited by the server to provide an illusion of a window in the second location to a user viewing the video. A second length-of-day at the second location in the video is synchronized with a first length-of-day at the first location. The video is sent to the electronic display for viewing by the user.

In other embodiments, an assembly for a virtual window includes a casing configured to surround a virtual frame of the virtual window and be installed on a wall to seal a perimeter of the virtual window to the wall. One or more panes of glass or acrylic are attached to the casing and spaced from the virtual window by a particular separation. The one or more panes are configured to permit a user located at a first location to view the virtual window through the one or more panes. The one or more panes provide first reflections of light to the user. One or more muntins or mullions can optionally be attached to the casing and configured to separate at least one pane of the one or more panes from at least another pane of the one or more panes. The muntins support the one or more panes at the particular separation from the virtual window. One or more processors are configured to be positioned and covered by the casing. The processors are further configured to receive a video depicting a view of a second location and generate the virtual frame. The generation includes providing second reflections of at least a portion of the view on the frame. The processors synchronize a time-of-view at the second location in the video with a time-of-day at the first location. The processors synchronize a second length-of-day at the second location in the video with a first length-of-day at the first location. An electronic display is communicatively coupled to the one or more processors and configured to be positioned and surrounded by the casing. The electronic display is further configured to display the video and the virtual frame to provide the virtual window for viewing by the user.

The advantages and benefits of the virtual window apparatuses and systems described herein include providing digital images and videos to simulate windows at a user's location. The embodiments provide pleasing scenes from other locations such as, for example, tropical beaches. Using the system disclosed, a sense of motion can also be provided using digital image relays and recordings. The virtual windows disclosed cause viewers to experience a sense of disbelief, e.g., to give the viewer the sense that they are looking through a real window. When content for unexpected events or time synchronization is added, an increase in efficiency is achieved since the video clips generated are in a range from 4 to 20 seconds. Such files are more efficient to transmit to the display because of their relatively smaller size. Using the disclosed methods, an entire view can be downloaded into a client virtual window system having onboard storage. Moreover, custom codecs are designed for higher resolution, lower framerate, and more efficient video event insertion. Using the embodiments disclosed herein, different exterior locations are realistically simulated to provide an illusion that a user is looking through a window at a physically different location from where they are currently situated. The virtual window can be positioned in a portrait or landscape configuration to fit visually best within the location it is placed. For example, in a location having vertical windows or other such features, the electronic display is positioned vertically in a portrait orientation to match the windows. In an environment having horizontal windows or other such features, the display is positioned horizontally in a landscape orientation, improving functionality and aesthetics.

FIG. 1 is a block diagram illustrating a system for generating views from virtual windows, in accordance with one or more embodiments. A view refers to all the things that can be seen from a virtual window. The system illustrated in FIG. 1 is used to realistically simulate different exterior locations within an interior location. The system is implemented using components of the example computer system 2200 illustrated and described in more detail with reference to FIG. 22. Likewise, other embodiments include different and/or additional components, or are connected in a different manner.

In some embodiments, one or more processors 12 receive a video depicting a view 21 of a geographic location. The processors 12 can be part of the electronic display 10, separate from and electronically coupled to the electronic display within the virtual window, or part of a remote server implemented using components of the example computer system 2200 illustrated and described in more detail with reference to FIG. 22. For example, electronic displays having faster processors do not need a separate processor to control video. The electronic display 10 shown in FIG. 1 is provided with video or image information, which can include a live video stream of the view 21, e.g., as streamed to one or more processors 12 from a camera 22, e.g., a webcam or other type of camera. The electronic display 10 is thus is configured to provide an illusion to the user of viewing the geographical location through the virtual window. An example virtual window 1512 is illustrated and described in more detail with reference to FIG. 15. In some embodiments, the one or more processors 12 generate and composite an image of a virtual frame 20 with the video to provide an illusion of a window in the user's location to a user viewing the video. A virtual casing can also be generated surrounding the window. An example actual casing 1704 is illustrated and described in more detail with reference to FIG. 17.

In other embodiments, the electronic display 10 is configured to be mounted on a wall in the user's location (see the electronic display 1604 illustrated and described in more detail with reference to FIG. 16), embedded in a wall in the user's location, fully portable (carried by the user or a vehicle), attached to other objects, or itself part of another device in the user's location. The one or more processors 12 are electronically coupled to the electronic display 10 and configured to receive the video from a server. The video depicts the view 21 of the geographic location and can includes an image of a virtual casing, the virtual frame 20, or (optionally) one or more virtual muntins or mullions. The image is composited with the video by the server to provide an illusion of an actual window in the user's location to a user viewing the video. The virtual casing surrounds the illusionary window. In some embodiments, the one or more processors 12 are further configured to generate a second image of one or more panes of glass attached to the virtual casing or virtual frame 20. The one or more virtual panes can be separated by virtual muntins or mullions. The processors 12 composite the video with the second image to provide reflections of light to the user.

In some embodiments, the video or image information includes a library 14 of image information that is stored in a database 13 that is accessible by the processors 12. In other embodiments, streaming video is used. The video can be streamed from a remote server or locally, e.g., from storage that is proximate to the processors 12, such as detached storage, network attached storage (NAS), Internet service provider (ISP) caches, etc. The information is preferably video information, i.e., a view that is dynamically changing over time. In some embodiments, the processors 12 provide a backup image on the electronic display 10 responsive to detecting an interruption in transmitting a video to the electronic display 10. For example, a still image is used in some embodiments or a still image can be provided as a backup in the event the dynamic image is interrupted. The processors 12 provide localization and realism by, for example, tracking the local weather 18 and processing the video to reflect current weather conditions. The view 21 tracks local sunrise/sunset conditions 16 using a look-up table in the database 13, etc. Further, the processors 12 can adjust the duration of a prerecorded view, such that the display 10 shows a current accurate sunrise and sunset for local conditions. In an embodiment, a recording of a remote location is time shifted, e.g., a scene from Paris, France can be time shifted to show a Paris sunrise in Dallas, Texas at the time the sun rises in Dallas.

In some embodiments, the one or more processors 12 track a perspective of the user relative to the electronic display 10. The processors 12 modify the video based on a change in the perspective. In some embodiments, the perspective is based on a distance of the user from the electronic display 10 and an angle at which the user is viewing the electronic display 10. Tracking the perspective includes eye tracking or facial tracking. For example, when a user's gaze within a room changes perspective, the view 21 of content on the electronic display 10 is changed to match the perspective of the user relative to the screen, i.e., the user's parallax. A camera on or around the display 10 tracks the user's angle and distance from the display 10, e.g., via eye tracking and/or facial tracking. An algorithm is run to change the video currently being displayed. The eye tracking mechanism 19 tracks the eye movement and/or facial movement of a user as the user gazes through the virtual window provided by the display 10. Responsive thereto, the processors 12 alter the perspective of the video on the display 10, such that the video appears as would be expected as the user gazes at a real view. Such modification occurs in real time on the processors 12, although in some embodiments, such as using 5G, the response time is near enough to real time to suffice.

In some embodiments, the one or more processors 12 store the video on a memory (e.g., a memory stick, a RAM, a hard drive, etc.) of the electronic display 10. The memory can be implemented using the components illustrated and described in more detail with reference to FIG. 22. The one or more processors 12 can be located within the electronic display 10. In other embodiments, the one or more processors 12 are located remotely to the electronic display 10. For example, the image information can be of the user's location, e.g., a view that one would expect if the display 10 were an actual window or the image information can include a view from any location, e.g., the user can access a desired view 21 from the library 14 of image information. All or some of the image information sent to the display 10 can be streamed and/or some or all of the image information can be stored on the display 10, where the system streams the rest. Embodiments include a combination of onboard storage and the ability to stream, and make the most efficient use of both, depending on the user's Internet connection.

In embodiments, via a user interface, such as a gesture sensor 17, the user can select a single view 21, a montage of views, etc., from any one or more locations, e.g., a winter scene in the mountains, a summer scene by the sea, etc. The gesture sensor 17 can be located in the display 10 or in a window sill or shelf associated with the display 10. An example window sill 1708 is illustrated and described in more detail with reference to FIG. 17. The gesture sensor 17 can also change the volume shown on the display 10, in a manner that is consistent with the motion of lifting a window up or lowering it. In some embodiments, the one or more processors 12 provide a signal to a haptic feedback device 23 located within the electronic display 10 or on a shelf or window sill below the electronic display 10. The signal instructs the haptic feedback device 23 to provide haptic feedback to the user. For example, the haptic feedback device 23 is provided, such that operating the virtual window gives the sensation of the window sliding in a track, etc.

In some embodiments, the processors 12 send audio signals to a speaker 15 located proximate to the electronic display 10. The speaker 15 plays ambient sounds associated with the video. For example, the speaker 15 associated with the electronic display 10 plays ambient sounds associated with the view 21. The speaker 15 can be located in the electronic display 10 or in a ledge or shelf associated with the electronic display 10. Such sounds can be captured in real time with a microphone (not shown) that is part of the camera 22 (e.g., a webcam or other type of camera) used to stream the view 21, or the sounds can be recorded with a stored scene. For example, a sunrise view can be accompanied by bird song. In embodiments, the actual sounds can be edited or enhanced. For instance, when a video recording is made at, for example Big Sur, California, it is preferred that noises, such as car noises or noises of the crew talking by the camera, be edited out of the recording.

Figure 2:
FIG. 2 illustrates an example view of an urban area displayed using a virtual window, in accordance with one or more embodiments.

FIG. 2 illustrates a view of an urban area displayed using a virtual window, in accordance with one or more embodiments. The image or video information can be of a user's location, e.g., a view that one would expect if the virtual window was an actual widow or the image information can include a view from any location, e.g., the user can access a desired scene from a library of image information. An example electronic display 10, library 14, and view 21 are illustrated and described in more detail with reference to FIG. 1. An example virtual window 1512 is illustrated and described in more detail with reference to FIG. 15. In some embodiments, a camera (e.g., a webcam or other type of camera) is placed on an outer wall of a structure at a place coincident with where the electronic display is placed on an inner wall. An example camera 22 is illustrated and described in more detail with reference to FIG. 1. The camera streams a video to the electronic display that includes the view that would be seen if a window was actually in the location where the electronic display is placed. Embodiments also place cameras in various locations around the world to provide a live view, not just on the outer wall of their structure, but at all of these other locations. As mentioned above, the user can select among these views or can set a random or programmed location among these views.

Figure 3:
FIG. 3 illustrates an example view of a suburban area displayed using a virtual window, in accordance with one or more embodiments.

FIG. 3 illustrates a view of a suburban area displayed using a virtual window, in accordance with one or more embodiments.

Figure 4:
FIG. 4 illustrates an example winter scene displayed using a virtual window, in accordance with one or more embodiments.

FIG. 4 illustrates a winter scene displayed using a virtual window, in accordance with one or more embodiments. In some embodiments, one or more processors are configured to retrieve a type of weather from an online database. Example processors 12 and a database 13 are illustrated and described in more detail with reference to FIG. 1. The processors modify the video to depict the type of weather within the view. An example view 21 is illustrated and described in more detail with reference to FIG. 1. For example, the weather is detected via the online database, and the weather characteristics found in the online database are added to the video, e.g., snow or rain, and then displayed.

Figure 5:
FIG. 5 illustrates an example tropical scene displayed using a virtual window, in accordance with one or more embodiments.

FIG. 5 illustrates a tropical scene displayed using a virtual window, in accordance with one or more embodiments. One or more processors synchronize a time-of-view at the geographic location captured by a camera (e.g., a webcam or other type of camera). The time-of-view in the video is synchronized with a time-of-day at a user's location. An example camera 22 and processors 12 are illustrated and described in more detail with reference to FIG. 1. For example, video of a view is played on an electronic display, where the video of the view syncs with the actual time-of-day at the electronic display. An example electronic display 10 and view 21 are illustrated and described in more detail with reference to FIG. 1. The processors synchronize a length-of-day at the geographic location in the video with a length-of-day at the user's location. For example, an entire day from sunset to sunrise is accurately represented, and many hours are shot, photographed, and streamed at each geographic location to cover the time before and after sunrise and sunset to be accurate in each location.

Figure 6:
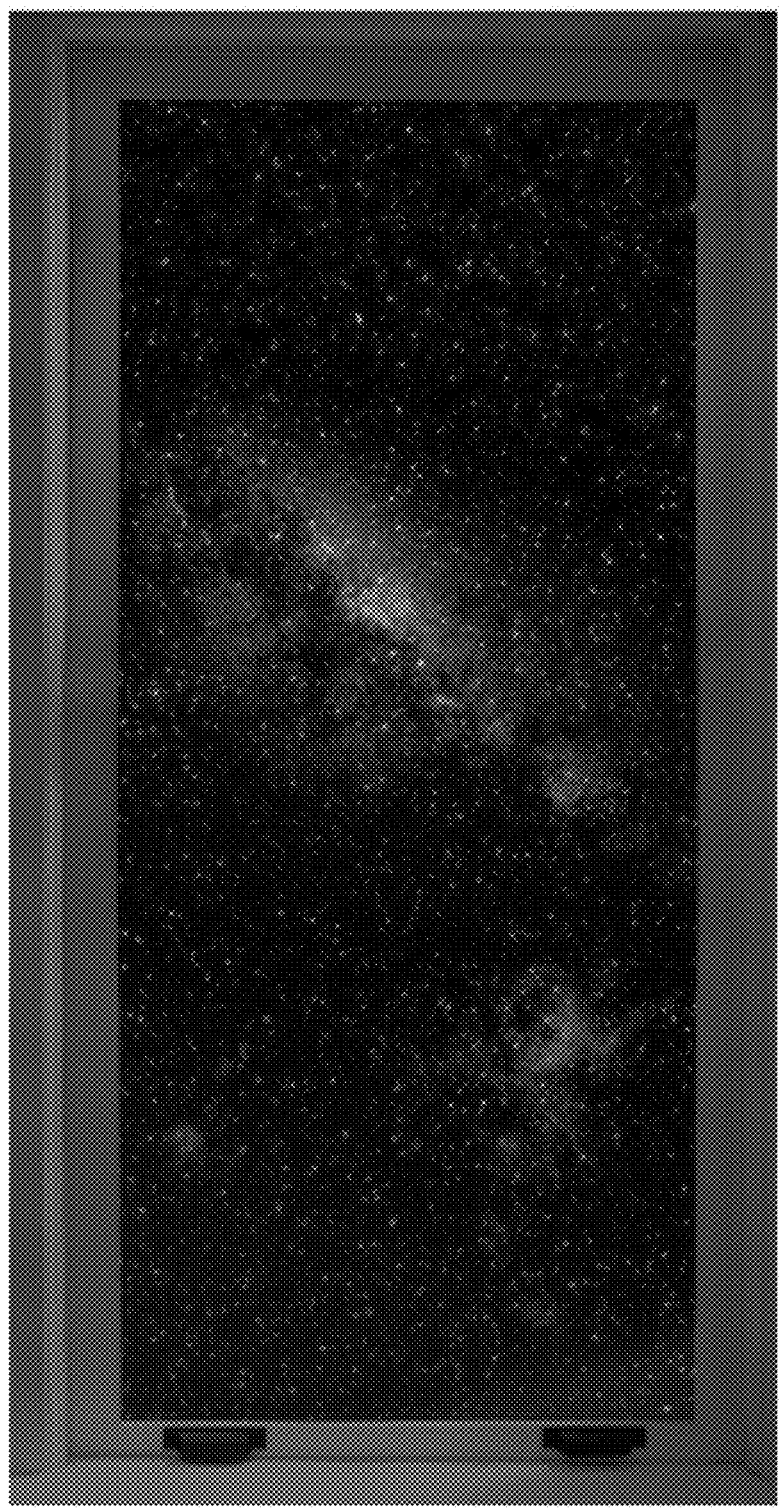
FIG. 6 illustrates an example view of a night sky, in accordance with one or more embodiments.

FIG. 6 illustrates a view of a night sky, in accordance with one or more embodiments. In some embodiments, the view of the night sky is an animated three-dimensional (3D) model that is simulated to appear photorealistic to a user's eye.

Figure 7:
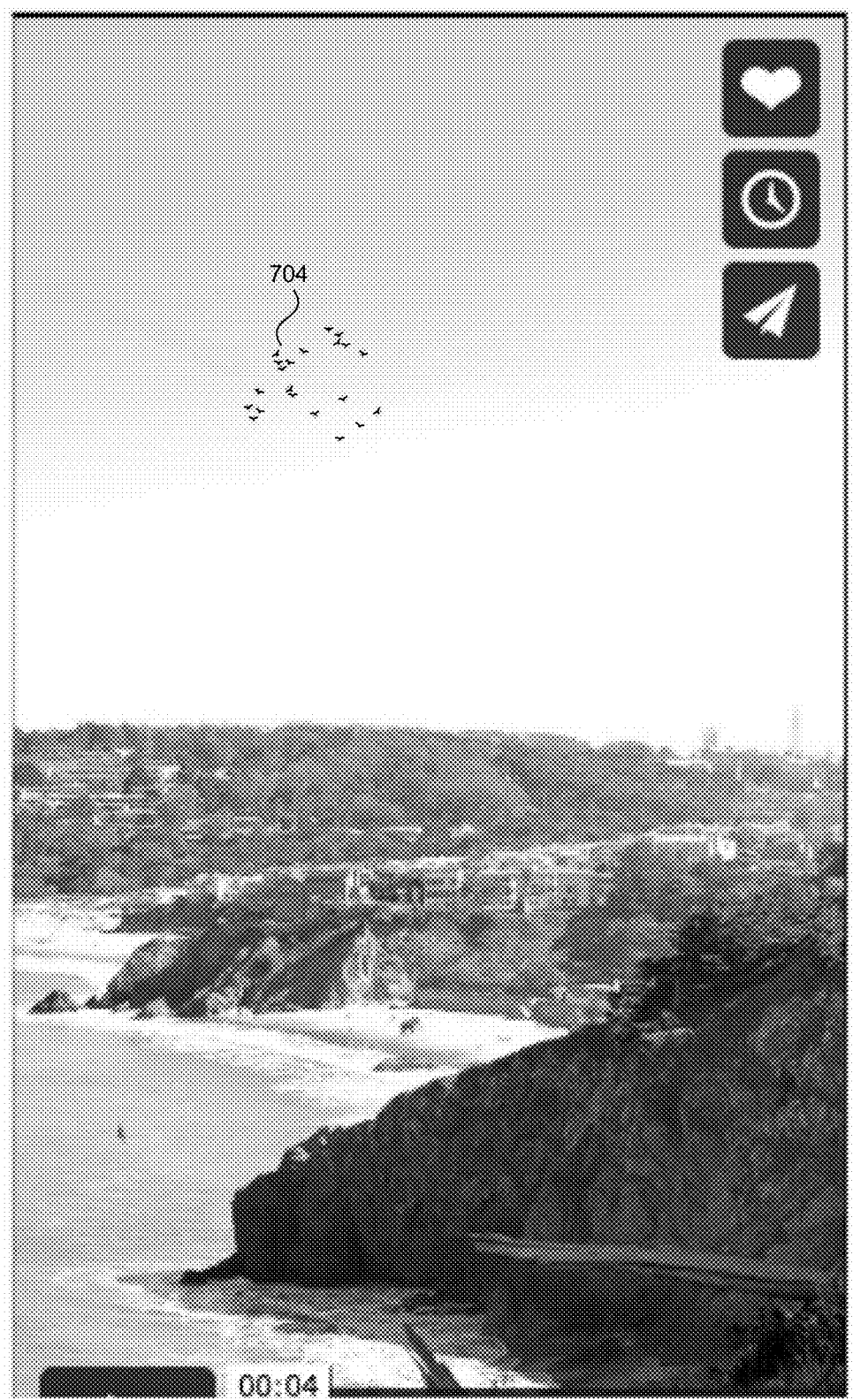
FIG. 7 is a screenshot of an example event displayed using a virtual window, in accordance with one or more embodiments.

FIG. 7 is a screenshot of an example event displayed using a virtual window, in accordance with one or more embodiments. The event includes birds 704 flying across a view. The screenshot in FIG. 7 also shows optional icons displayed at the top right of the virtual window and a time code at the bottom of the virtual window. The icons and time code can be displayed by a user or a person implementing the virtual window using display options for extra information. FIG. 7 illustrates embodiments in which a video of a view is augmented with a photorealistic object or animated object for display in the view. An example view 21 is illustrated and described in more detail with reference to FIG. 1. Movement of the object(s) in the view is referred to as an event. At least one feature of the photorealistic object or animated object can be modified based on the time-of-view at the geographic location. For example, the processors can insert photorealistic, animated, or fantastical objects into a view to provide variety and customization to pre-recorded or live video content or photographic content. A user can choose to add a sailboat, the birds 704, or a horse into a view in day or night to give a greater sense of reality in video that is looped and repeated by adding randomness of objects or add to any footage.

FIG. 7 shows an unexpected event in which the birds 704 fly across the sky. In embodiments, additions to a video can also include 3D topography of a view, metadata gathered via an online database, 3D mapping techniques using stereo cameras, etc. As the time-of-day changes, the objects' lighting is changed in synchronization to a location of the sun to make the video even more realistic. The objects can be pre-rendered or the lighting can be altered and then be rendered in real time based on the time of day, using sun and location tables either in the cloud or on an electronic display based on the location of the virtual window. In some embodiments, features of each object are randomized within realistic bounds, such as a number of the birds 704 in a flock, each bird's wing flapping speed, or speed of each bird in the flock to make it feel more real and not simply a video loop being added. In embodiments, the unexpected objects could be in the form of unexpected events that occur at varying or regular intervals. Further, in embodiments, the unexpected objects can interact with 3D and other aspects of a view, for example, an elephant would appear to walk up the slope of a beach in a realistic fashion.

In some embodiments, a user can, through an interface (e.g., the user device 1504 illustrated and described in more detail with reference to FIG. 15), choose to have an unexpected objects setting ON or not. The user can choose different permutations that include many or a few of these and settings in-between, and if they should occur during specific times or all day. In other embodiments, an application programming interface (API) connects to third-party apps to control the unexpected objects or event, when and how the objects are inserted, and which objects are inserted. An API can also connect to a third-party app to modify the video itself.

Some events are only visible during the day—see FIG. 14A, when there is illumination to see the objects. For instance, a boat in the water might not be visible during the night (see FIG. 14B) unless it moved over a light reflection in the water or it had its own lights. Birds flying at night over a dark sky would not be visible. The user would also include the types of events they desire for a specific view from a library of objects through a variety of interfaces, e.g., the a user device, a computer, gesture controls, remote control, facial recognition of different people in the home or office, etc., to select natural elements such as birds and people or physical elements such as boats and airplanes. Natural elements would match what would occur in nature, so an elephant would not appear in a beach in Florida but would in Thailand. In some embodiments, a user can also choose a fantastical setting where an elephant could appear in the beach in Florida, or a dragon could fly through the scene.

In some embodiments, the objects move and interact with the environment appropriately, so a boat would only be in water, and not on the beach. Or birds would not fly through a tree, but behind or in front of it. Similarly, some objects are not visible in the evening, unless they have light emitting from them, such as lights on a boat in the water—see FIG. 14B. The objects that are night friendly are noted as such on the interface. In some embodiments, the events are gamified, such that users can play a game where they look for objects that are hidden in each view. Users can also add their own objects in another embodiment and share them with any of their friends who have virtual windows that are connected to a virtual window system.

In some embodiments, augmenting the video includes receiving a video clip. The video clip includes a portion of the video and the photorealistic object or animated object. The video clip (sometimes referred to as a "clip") is a shorter portion of the video. One or more processors insert the video clip into the video at the time-of-view at the geographic location. For example, a team of artists and animators create each object using software-based tools. Once the objects are approved, they are placed in the view with the appropriate lighting for time-of-day and to make sure they interact correctly with other parts of the view, e.g., the birds 704 cannot fly through a tree, they need to fly behind, around it, or in front of it. A path is designated where specific objects can move within each view to address this issue. Because events can occur at any time of day, where the lighting changes based on the sun or objects that emit light in each view, each video clip is customized to feel authentic to the time-of-day when placed in a view. For instance, placing a flock of birds at 3:25 pm with birds that were rendered and lit from a view at 7:00 am yields unsatisfactory results, with the birds feeling fake because the lighting appears to be inauthentic to that time-of-day. Dozens of variations for each object are rendered to cover various times of day, and have slight changes in speed, direction, number, etc., to avoid appearing like a video loop. In embodiments, these video clips are rendered ahead of time, stored in the cloud, and then sent to the electronic display to be inserted in the longer view footage at a precise time. For instance, the birds coming on at 3:25 pm are composited for that specific time, sent to the electronic display, and then inserted precisely at that time, so as not to cause a jump in the video, i.e., an uneven or jerky transition as opposed to a smooth, seamless transition.

In some embodiments, an amount of compression of the video matches an amount of compression of the video clip. For example, the compression of both the view and the video clip is exactly the same or matches, such that the edit to the video is not noticeable. The compression of the original view (the video) and of each clip is kept the same for the unexpected event to be undetectable by a user. If the view was compressed at H.265 and the clip at H.264 or at H.265, but not the exact same settings, the clip would not match when it is inserted into the view and would break the illusion. Advanced Video Coding, also referred to as H.264 or MPEG-4 Part 10, Advanced Video Coding, is a video compression standard based on block-oriented, motion-compensated integer-DCT coding. High Efficiency Video Coding, also known as H.265 and MPEG-H Part 2, is a video compression standard designed as part of the MPEG-H project as a successor to the widely used Advanced Video Coding. In other embodiments, the compositing of the images and the lighting modification is performed on the client side of the virtual window. The "client," "client system," and "client virtual window system" refer to the combination of one or more processors, memory, and the electronic display that make up the virtual window. In some embodiments, standard objects are stored in a library and rendered on-the-fly as appropriate for the time-of-day that the object is to be displayed. An example electronic display 10 and library 14 are illustrated and described in more detail with reference to FIG. 1. For example, a generic flock of birds can be displayed at any time-of-day once they are rendered in real time to exhibit appropriate lighting. As well, local weather conditions can be taken into account when rendering an object. For example, the sails in a sailboat can flutter in accordance with the true velocity and direction of the wind.

The embodiments disclosed herein reduce the need for the processors or electronic display to download an entire new view each time there is a change to the view, such as with time synchronization or with unexpected events, or other features. A virtual window system (as illustrated and described in more detail with reference to FIG. 1) can perform time synchronization in two ways. First, a time-of-view (the particular time that a point in the video was recorded) at the second location is synchronized to play at a matching time-of-day at the first location. For example, a scene recorded at 8 am in the video is played when it is 8 am at the user's location. Second, the length-of-day of the second location in the video is synchronized with the length-of-day at the first location. For example, the video is shortened or lengthened to match the length-of-day at the user's location. The time synchronization artificially synchronizes the time-of-view in the video displayed in the virtual window (e.g., the sunrise and sunset) with the physical location of the virtual window (or any chosen location) to mimic a 24-hour day, such that the lighting displayed in the video is consistent with the time-of-day in each location.

In embodiments, each view is typically 24 hours long and can be about 150-170 GB (or larger) in size. Even a shorter view, e.g., 30 minutes can consume bandwidth. Hence, the embodiments disclosed obviate downloading the entire file, e.g., 150 GB (or larger) repeatedly. The video in the view is modified without the user observing this. In some embodiments, editing is performed using a dissolve and are timed carefully. A dissolve (sometimes called a lap dissolve) is a gradual transition from one portion of a video to another. A dissolve overlaps two shots for the duration of the effect, usually at the end of one scene and the beginning of the next. The use of a dissolve indicates that a period of time has passed between the two scenes. Because the system can process, for example, 4K 30 FPS video, video effects such as dissolves, cannot be easily performed on the electronic display. Thus, compositing is performed beforehand and stored in a library of video clips. The video clips are relatively smaller in file size and length because they only represent short scenes, such as birds flying through a view or a dissolve to bridge rewinding a view for time synchronization. In embodiments, the clips are from approximately 4-20 seconds or longer if necessary. Such files are more efficient to transmit to the electronic display because of their relatively smaller size. When content for unexpected events or time synchronization is added, an increase in efficiency is therefore achieved since the video clips generated are in a range from approximately 4 to 20 seconds.

In embodiments, an entire view is downloaded into the client virtual window system (see FIG. 1) that has onboard storage. Embodiments use custom codecs designed for higher resolution, lower framerate, and events insertion. If an object is added, e.g., birds 704 flying across the screen at 3:25 pm, the time is important because the user expects to witness an entire day on their virtual window as a seamless video with no cuts or interruptions. At 3:25 pm, the sun is at a specific height and if there is a view of a beach, the waves are crashing on the shore at a certain rate, people are walking on the beach, and other activities are happening at this specific time, etc. The birds 704 flying across the screen also need to have their lighting set for 3:25 pm.

In an example, if San Francisco view #1 has 120 clips of "Birds A" (a group of 10-30 sparrows flying together from left to right) at various times of day, which includes the actions for Birds A at 3:25 pm, then this clip is sent to the electronic display before the time this clip is to be used, in this case 3:25 pm, for insertion at a specific time-of-day. Before the 3:25 pm event of the birds 704 occurs, the 3:25 pm clip of Birds A is sent to the electronic display. This clip has lighting and a path that is correct for that specific time and the specific view and is 5 seconds in length. The client system saves this clip on the on-board storage. When the processors play the view at 3:25 pm, this clip is insert-edited precisely at 3:25:00 pm and then the original view resumes playing from the same point the 3:25 pm clip finishes, in this case, at 3:25:06. As such, the birds 704 fly across the view in the virtual window with no interruption. If the insertion of the birds 704 is not done in this manner, there would be a jump cut, i.e., if the clip was placed even a second or less before or after the specific time, it would create a momentary omission in a continuous shot, resulting an effect of discontinuity. If the lighting did not match, this would be noticeable as well. Depending on whether or not the clip is to be used at the client at a future date it is either saved on the client or deleted.

For time synchronization the video efficiencies work similarly. A virtual window system (as illustrated and described in more detail with reference to FIG. 1) can perform time synchronization in two ways. First, a time-of-view (the particular time that a point in the video was recorded) at the second location is synchronized to play at a matching time-of-day at the first location. For example, a scene recorded at 8 am in the video is played when it is 8 am at the user's location. Second, the length-of-day of the second location in the video is synchronized with the length-of-day at the first location. For example, the video is shortened or lengthened to match the length-of-day at the user's location. The time synchronization artificially synchronizes the time-of-view in the video displayed in the virtual window (e.g., the sunrise and sunset) with the physical location of the virtual window (or any chosen location) to mimic a 24-hour day, such that the lighting displayed in the video is accurate for the time-of-day in each location. In embodiments, a short, approximately 3-5 second video clip is used to add or subtract time in a view to match the time-of-day. The approximately 3-5 second clip is of a dissolve between two pieces of video, either extending the time or compressing it, as appropriate. The dissolve is used to hide the fact that the view was edited. Time synchronization either adds time to or subtracts time from a view to allow synchronization with the location of a virtual window to sunrise and sunset. Because every day has a slightly different sunrise and sunset time, the video footage is augmented daily. Without video efficiencies, this would mean every day sending a new 150 GB (or larger) file to the client.

In some embodiments, time synchronization is used to add time as follows. On installation, a virtual window is set with its geographic location, for example, by using a location obtained from a GPS system or other systems, together with sunset/sunrise information drawn from the Internet. In some embodiments, this is done using predetermined tables in case Internet connectivity is not available. Thus, the video synchronizes to the sunrise and sunset in a particular location. In some embodiments, the view is set in another location, such as on a spaceship or another planet, and different moon rises and sets can be programmed.

In some embodiments, synchronizing the length-of-day in the video with the length-of-day at the user's location includes rewinding, by the one or more processors, a portion of the video responsive to the length-of-day at the user's location being longer than the length-of-day in the video. The processors replay the portion of the video. For example, consider a view that was shot on January 19, and that day is 9:48:26 long (expressed in hours, minutes, seconds). The sunrise is at 7:19 am and sunset is at 5:09 pm. The user is looking at this view on July 8, when the length-of-day at the user's location is 14:48:05 with the sunrise at 5:44 am and sunset at 8:32 pm. In this case, the daylight from the day that the view was shot, January 19, needs to be extended by 4:59:30. To do this, the video of the view needs to play to a certain point and then rewind several times to extend the length. The procedure is performed several times to reduce the change in daylight in the view between points, such that the change is not or hardly noticeable to the user. Therefore, at 11:30 am, the video is rewound to 10:30 am, adding one hour of daylight. For illustration purposes only, the step would be performed again at 12:30 pm, 1:30 pm, etc., until the length-of-day is accurate for July 8, adding enough time to the day for sunset to be displayed in the video at 8:32 pm. If the procedure was performed by a simple edit, there would be a jump cut when the footage was rewound and played again. Not only does the brightness of the sun lighting the view change between 11:30 AM and 10:30 AM, but if it were a scene of a beach, the waves and the people on the beach would appear to jump as the video was rewound by one hour, and just played back—as things would be in different places and would ruin the illusion of the virtual window. To remedy this, a simple 3-5 second video dissolve is added between the shots. A dissolve is added between the shot at 11:30 am and the shot at 10:30 am, blending the scenes and significantly reducing the visibility of the cut. In embodiments, it is desirable to jump ahead instead of rewinding. For example, where the view is shot during the summer and there are 14 hours of daylight, but the user wants to watch the view during the winter, time in the video is compressed, i.e., to move forward to another time.

In embodiments, a 5 second clip of a dissolve is either created in the cloud or on a video editing system and stored in the cloud, then sent to the client system where it is used to add one hour to the view. The "client," "client system", and "client virtual window system" refer to the combination of one or more processors, memory, and the electronic display that make up the virtual window. The video on the client's virtual window would play, and then at 11:30:00 am, the client system plays the clip with the dissolve, bridging 11:30 am to 10:30 am, and then the video continues playing from the 10:30:05 mark. In embodiments, the video clip is pre-rendered because some client systems are unable to perform a high resolution and high framerate dissolve in real time. In other embodiments, it is possible to perform a high resolution and high framerate dissolve in real time on the client system, saving resources in pre-rendering and saving the clips to the cloud. When the high resolution and high framerate dissolve is performed in real time locally on the client, the time synchronization feature runs in the background while the client system is playing the video, displaying the interface, etc.

Figure 8:
FIG. 8 illustrates example views from two corner windows displayed using a virtual window, in accordance with one or more embodiments.

FIG. 8 illustrates example views from two corner windows displayed using a virtual window, in accordance with one or more embodiments. The virtual window shown in FIG. 8 mimics actual corner windows. For example, computer software can take a view and project it onto the corner windows by warping or reconfiguring the view to account for the corner windows configuration. In other embodiments two virtual windows can be placed at a corner of a room, such that each virtual window is perpendicular to the other. The two virtual windows thus have 90-degree views. Corner virtual window panels act similarly to panorama virtual windows because the content goes across both virtual windows, but at 90°.

Figure 9A:
FIGS. 9A and 9B illustrate example views having objects in the foreground displayed using virtual windows, in accordance with one or more embodiments.
Figure 9B:
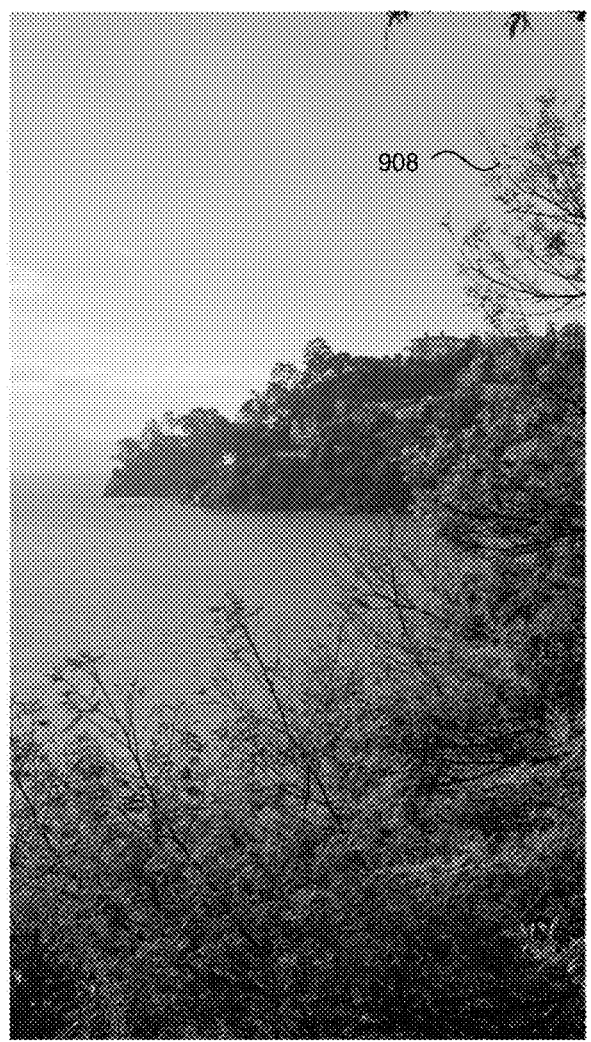

FIGS. 9A and 9B illustrate example views having objects 904, 908 in the foreground displayed using virtual windows, in accordance with one or more embodiments. The virtual window views with the objects 904, 908 (branches and leaves) in the foreground simulate the views from actual windows. To generate a realistic view as if from an actual window, the virtual window system uses several factors. The composition of a view displayed by a virtual window (e.g., the virtual window 1512 illustrated and described in more detail with reference to FIG. 15) is different from a composition of a landscape photograph for instance. In fact, if a photographer from Sunset magazine was shooting a similar view for the magazine, as compared to the virtual window, they would look different. Views from actual windows, unless they are unobstructed such as on a cliff, or being on a high floor in a tall building, usually have objects in the foreground, e.g., a branch, a top of a fence, a railing, etc. A view from the virtual window has detail mimicking actual windows that ties a view to the geographical location. In addition, the views for the virtual window have objects in focus, and nothing is blurry, as with an actual window. In embodiments, there preferably is a slight movement in each view, such as leaves slowly moving because of wind, to render the video more realistic than a still image.

Figure 10A:
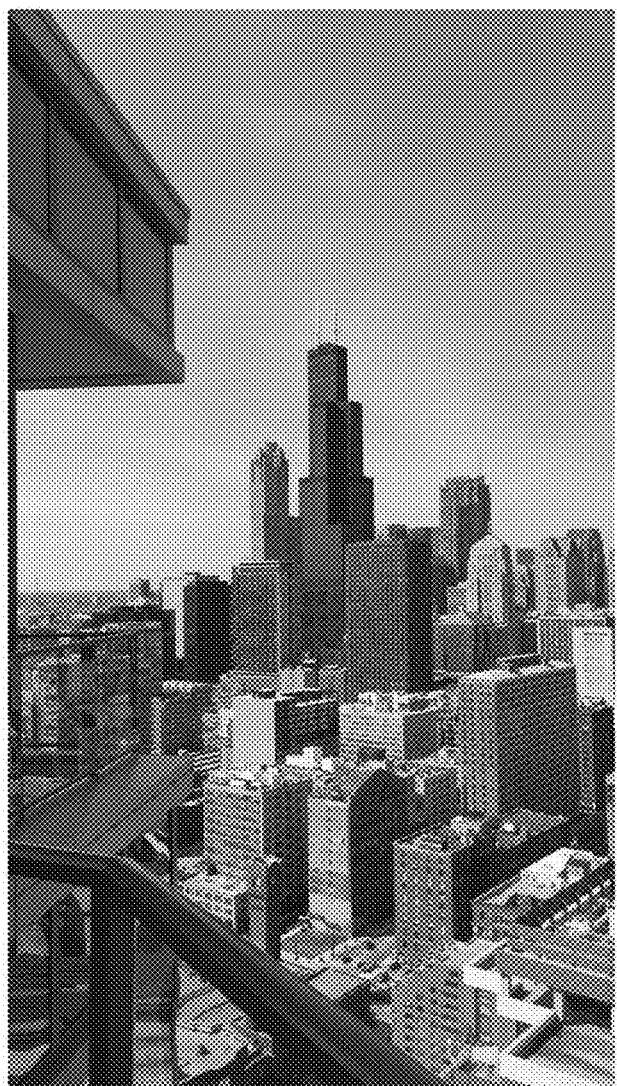
FIG. 10A illustrates an example view having an object in the foreground displayed using a virtual window, in accordance with one or more embodiments.
Figure 10B:
FIG. 10B illustrates an example view lacking an object in the foreground displayed using virtual windows, in accordance with one or more embodiments.

FIG. 10A illustrates an example view having an object 1004 in the foreground displayed using a virtual window, in accordance with one or more embodiments. FIG. 10B illustrates an example view lacking an object in the foreground displayed using virtual windows, in accordance with one or more embodiments. The view in FIG. 10A shows a railing 1004 in the foreground to give a sense this is an actual window. The view in FIG. 10B lacks the railing in the foreground and does not feel as real or authentic as the view in FIG. 10A. It is preferred to have objects in the foreground for a view to be realistically composed, although other embodiments do not have objects in the foreground.

In some embodiments, one or more processors generate a foreground object for display on an electronic display. An example electronic display 10 is illustrated and described in more detail with reference to FIG. 1. The foreground object is to provide the illusion of an actual window located in the geographical location to the user. For example, even when an unobstructed view is possible, it is advantageous to generate an object in the foreground to enhance the illusion of an actual window. Notice the railing 1004 in FIG. 10A, which makes the view more realistic as if it is from an actual window.

Figure 11:
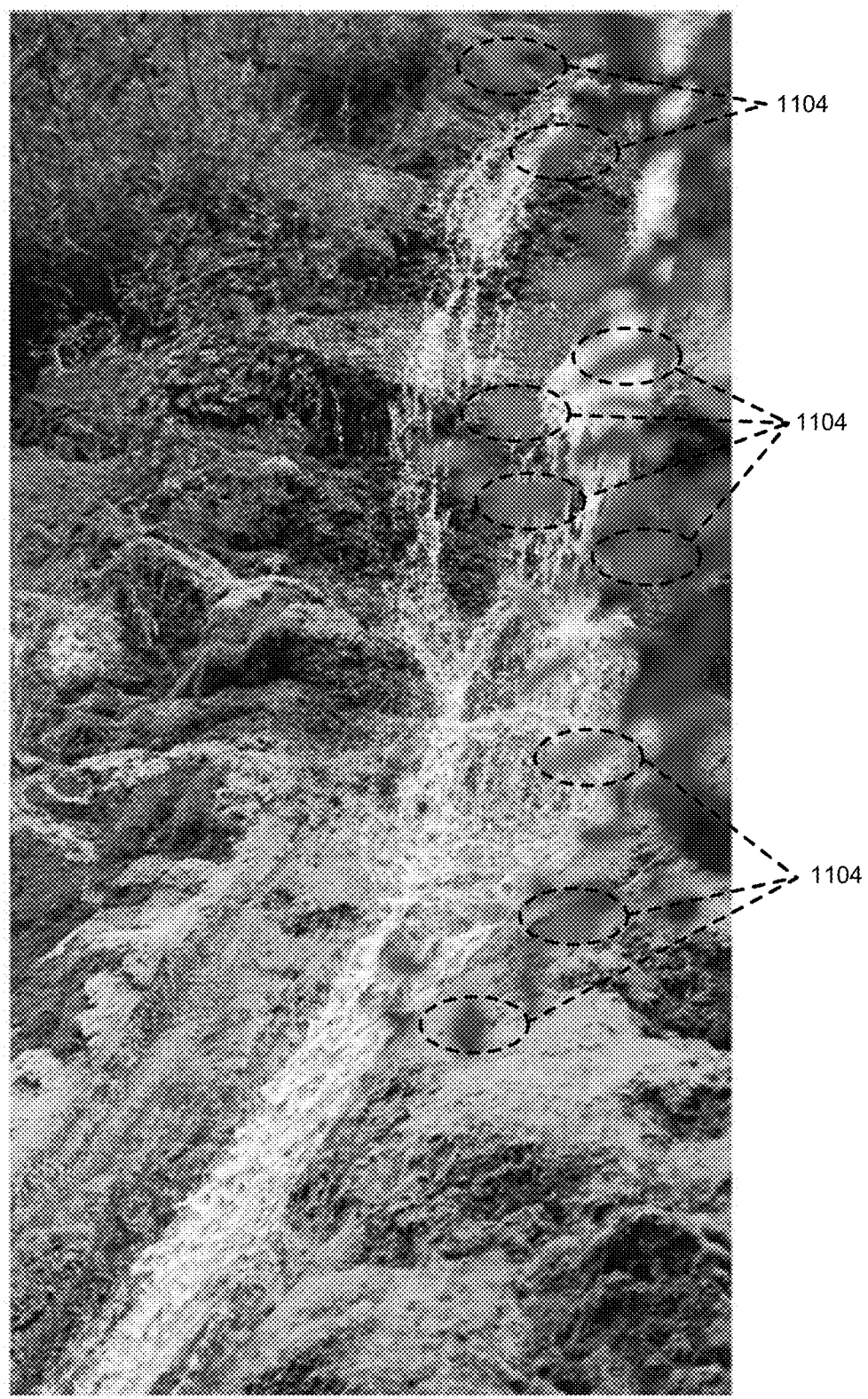
FIG. 11 illustrates an example unacceptable view having blurred leaves displayed in the foreground, in accordance with one or more embodiments.

FIG. 11 illustrates an example unacceptable view having blurred leaves displayed in the foreground, in accordance with one or more embodiments. The view in FIG. 11 would be unacceptable for use as a virtual window view since a user's eyesight would not be normally blurred in such a manner.

Figure 12:
FIG. 12 illustrates an example unacceptable view displayed using a virtual window, in accordance with one or more embodiments.

FIG. 12 illustrates an example unacceptable view displayed using a virtual window, in accordance with one or more embodiments. The view in FIG. 12 is of a location a few feet from an ocean and would be therefore unacceptable for a virtual window view because there would not normally be a structure that has a real window in such a location. Moreover, as the tide changes, a tripod holding a camera at such a location would be under water, or at low tide, the ocean would be far away.

Figure 13:
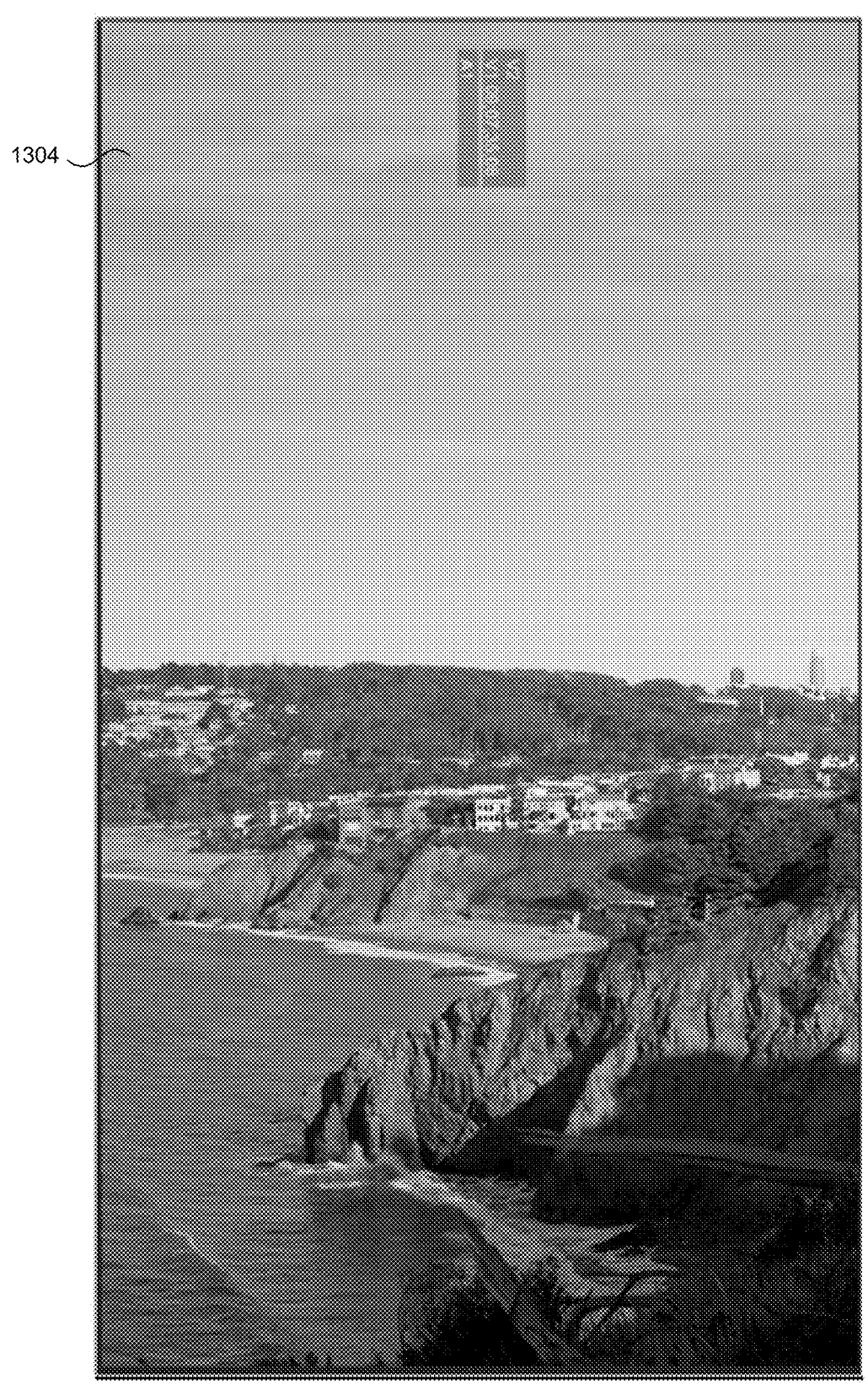
FIG. 13 is a screenshot of an example view from a virtual window where approximately half the frame shows the sky, in accordance with one or more embodiments.

FIG. 13 is a screenshot of an example view from a virtual window where approximately half the frame shows the sky, in accordance with one or more embodiments. The screenshot in FIG. 13 also shows an optional time code displayed at the top of the virtual window. The time code can be displayed by a user or a person implementing the virtual window using display options for extra information. The view shown in FIG. 13 has foreground elements at the bottom. When the sky is showing, approximately 50% of the frame is of the sky, mimicking the view of an actual window. As with most actual windows, the field-of-view of the virtual window includes a great deal of sky, assuming the sky is not obscured (e.g., from inside a forest or having trees or other objects obscuring the sky). The field-of-view is illustrated and described in more detail with reference to FIG. 21. Thus, virtual window views are typically composed with approximately 50% of the composition including the sky, as would be the case if the user was looking straight ahead from an actual window. So, if someone was above a beach, or even on a beach or a flat plateau, to create an authentic looking view from a window, the field of view would include much of the sky.

FIG. 14A illustrates an example day view of a particular area displayed using a virtual window, in accordance with one or more embodiments. In some embodiments, synchronizing the length-of-day in the video with the length-of-day at the user's location includes increasing or decreasing, by one or more processors, an amount of time a portion of the video is displayed on an electronic display. An example electronic display 10 is illustrated and described in more detail with reference to FIG. 1. For example, a virtual window shows 24 hours of video of a view and matches sunrise through sunset to be accurate in each location. The video on the display can be synchronized in real time with rising and setting of the sun in the location where the user has installed the virtual window. The length-of-day at the user's location changes daily. One day can have 14.5 hours of sunlight with sunrise at 5:17 am on one day and sunset at 8:50 pm. On December 7, the sunrise can be at 7:12 am and sunset at 4:51 pm with 9.5 hours of daylight. In some embodiments, the processors retrieve the local sunrise/sunset times in sunrise/sunset tables, and then automatically modify the pre-recorded video without obvious edits, to shorten (or lengthen as the case may be) the time the video is displayed without showing a "jump cut," such that the daylight hours of the display and the actual daylight are coincident.

FIG. 14B illustrates an example night view of the particular area displayed in FIG. 14A, in accordance with one or more embodiments. There are visible lights 1404 and some lights that cannot be readily seen, such as stars and planets that are in the video as well. Virtual window views typically have a single composition that works for both day and night without moving the camera. This often means other light sources are needed in a view, such as windows, fires, boats with lights, airplanes, etc. A beautiful mountain view would work better as a virtual window view if it was under a full moon and you could actually see the mountain, and/or there were lights/campfires on the mountain. A view in the evening without ambient light would not work for a night view, as the composition would be completely dark. Additionally, because of limitations of the sensitivity of video cameras, the stars, satellites, and planes may not be visible in a night view. Embodiments augment night skies with digital stars, planets, and other objects that move in the sky to address issues of views needing more illuminated objects.

FIG. 15 is a block diagram illustrating an example system for generating soundscapes, in accordance with one or more embodiments. In embodiments, users have the ability to generate custom soundscapes using the user devices 1504, 1508 to accompany the virtual window views by using controls within a mobile app (or other devices, including the virtual window 1512 itself) to adjust the volume levels of various sounds in the view per their preference. In embodiments, a user is presented with multiple audio channels. For instance, a view of a jungle can include the sounds of wind, rain, the sounds of the surf nearby, and the sounds of birds chirping. The user can choose to lower the volume levels of the wind channel but increase the sounds of the rain and birds channels. This feature provides customizability and improves immersion. The mix of sound channels can also be changed.

In some embodiments, the one or more processors are further configured to receive a command from a user device 1504 (e.g., a smartphone, a tablet, a computer, a controller, or another consumer electronic device). The controller can be a dedicated or universal remote control implemented using the components illustrated and described in more detail with reference to FIG. 22. The command indicates a type of window frame, casing, or muntin. An example window frame 1712, example casing 1704, and example muntin 1716 are illustrated and described in more detail with reference to FIG. 17. Casings refer to moldings that go around window frames. Casings can be installed outside a house to seal the window frame to the house blocking cold air from entering the interior. Alternately, casings are the finishing touch to a window installation, similar to baseboards and door moldings. A window frame is the combination of the head, jambs and sill that forms a precise opening in which a window sash fits. A muntin, muntin bar, glazing bar, or sash bar is a strip of wood or metal separating and holding panes of glass in a window. One or more processors retrieve the type of window frame, casing, or muntin from a library. A virtual frame, virtual casing, or virtual muntins or mullions for an electronic display are generated to match the type of window frame, casing, or muntin. An example electronic display 10 and virtual frame 20 are illustrated and described in more detail with reference to FIG. 1. Generating a virtual frame or virtual casing includes providing reflections of at least a portion of the view on the virtual frame or virtual casing. In some embodiments, an image overlaid on the view provides reflections of at least a portion of the view on the casing, the virtual frame, and the one or more optional muntins or mullions.

In some embodiments, in a home or office setting, a user interface device, such as a smartphone 1508, a computer interface, or other interface, e.g., in a dedicated controller, is provided in which the user chooses a virtual casing from a library of many window casings to match or get as close to as possible the user's taste and match what they already have installed with an actual window. In some embodiments, the virtual casing is composited on the display over the view being displayed in the virtual window 1512 to give the appearance of a real window casing.

In some embodiments, compositing an image with the video includes analyzing, by the one or more processors, at least one of lighting, apparent color temperature, and content of the video. The processors adjust the lighting and apparent color temperature to the image, such that the illusion provided to a user includes the virtual casing being located at the user's location. For example, compositing includes analyzing the lighting, apparent color temperature, and content of the background video and adjusting the lighting and color temperature to the foreground image, i.e., the virtual window casing, to give a user the impression that the window casing is in the same location as the background. Because the quality of light changes over the course of a day, the processors include a scene analysis engine that tracks such aspects of the view as lighting, temperature, hues, etc. As discussed herein, a virtual frame can be composited with the video to provide an illusion of a real window. The processors can adjust the color temperature, etc., of the virtual frame, such that the virtual frame appears as a realistic window frame with its colors, shades, shadows, and the like reflecting the actual ambient conditions of light that would stream through a real window and impinge on a real window frame.

In some embodiments, a hue of the virtual casing changes as a time-of-day at the geographic location changes. For instance, if the background video is of a beach, the window casing appears to have the white light from the sand reflecting on it as would be the case if the user were looking through an actual window at that scene. However, at sunset, the window casing can pick up an orange hue and become a little darker to match the ambient light from the sunset. When the sun sets, and there is only light from the moon or stars, the window casing changes again. The window casing changes gradually as the background video changes to let the user feel as they are in that specific location at that specific time.

Figure 17:
FIG. 17 illustrates an example configuration for a virtual window, in accordance with one or more embodiments.

In other embodiments as shown in FIG. 17, a physical window casing 1704 or frame 1712 is positioned over a perimeter of the electronic display. In some embodiments, the one or more processors are further configured to generate an image of a semi-transparent layer having dimensions matching the electronic display. The processors composite the image with the video to provide an illusion to the user of viewing a glass window. For example, a semi-transparent layer is composited with the background video to give the impression of the glass in the virtual window. The user separately choses a background/view from a library of views from all over the world, that is composited in the cloud. A server then sends the composited video to the display to play, download, or steam the content.

In some embodiments, the one or more processors detect that a user device (e.g., the user device 1504) of the user is connected to a wireless network. The electronic display is connected to the same wireless network. The one or more processors display an avatar of the user on the electronic display, such that it appears in the virtual window 1512. In some embodiments, when two users live in a household together, and have a virtual window app controller on their user devices 1504, 1508, are virtually connected in other ways such as a facial recognition system on the virtual window 1512 itself, or both are connected to the virtual window 1512 via a local network or other networking technology, then they can choose an object that represents themselves, such as an avatar, to appear in the virtual window 1512 when they are in the same network as that of the virtual window 1512. The networking technology used can be Wi-Fi, Bluetooth Low Energy (BLE), or 5G and geolocation. For instance, user A can choose to be represented as an elephant and user B can choose to be represented as a bald eagle. When the network detects their user devices 1504, 1508 on the network, a bald eagle and elephant occasionally appear in the view. When user A or user B leaves the network or the location, or after a fixed amount of time when they are no longer visible to the facial recognition system, their objects no longer appear.

In some embodiments, a view depicting a house somewhere in the world is displayed in the virtual window 1512. The house is representative of a friend or colleague that has allowed a user to connect to the friend's house using the virtual window 1512. The friend can let the user know the friend is home by the system detecting the friend through their mobile device or other system that has the virtual window app installed. To show the friend is home on the user's virtual window 1512, for example, the drapes in the house in the view might be raised during daylight hours or the lights inside go on in the evening, thus indicating they are home.

Figure 16:
FIG. 16 illustrates an example configuration for virtual windows, in accordance with one or more embodiments.

FIG. 16 illustrates an example configuration for virtual windows, in accordance with one or more embodiments. In some embodiments, an electronic display 1604 is mounted on the wall. The "on wall" version can sometimes be easier to install, mounted as a picture frame or a television. The "on wall" version can also have a window trim, window sill, and acrylic or glass, as shown in FIG. 17. An "on wall" version hangs on a wall and protrudes from the wall, whereas an "in wall" version (used in the opening 1608) is set into the wall itself. The electronic display 1604 is positioned in a portrait or landscape configuration to fit visually best within the physical location it is placed. In a location having vertical windows or other such features, the electronic display 1604 is positioned vertically in portrait orientation to match the other windows. In an environment having horizontal windows or other such features, the electronic display 1604 is positioned horizontally in landscape orientation.

In other embodiments, an electronic display is configured to be embedded in an opening (e.g., opening 1608) in a wall in the user's location, fully portable (carried by the user or a vehicle), attached to other objects, or itself part of another device in the user's location. For example, the electronic display can be embedded in the wall (e.g., in the opening 1608) in a portrait or landscape configuration to match a layout of another window in the wall. The opening 1608 illustrates a "back box" used to encase the display and place it within the recessed space (opening 1608) in the wall.

In some embodiments, a user's experience is enhanced by placing two, three, or more panels near or next to each other to create a panorama, a surrounding scene, or other juxtaposed effect, sometimes referred to as a "combined view." An aspect of the virtual window is that each view can be shot, for example, in 8K horizontal, allowing three 4K vertical views, one large horizontal view, or one panorama to be created. In one embodiment, such a combined view is partially or fully achieved with existing display(s), physical window(s), or controller(s) that are already installed at the user's location. A user can benefit from a subscription to multiple views without the need for additional hardware, windows, or a controller. The virtual window embodiment disclosed herein further include an app or, in embodiments, a set-top box such as an Amazon Fire-Stick, that can have a less-expensive subscription. In embodiments, horizontal content is preferred. Further, some content can be shot dynamically in different resolutions.

The virtual windows disclosed contain software and/or hardware that, if there are two or three virtual windows for a combined view, sense each other virtual window and place each virtual window (e.g., the virtual window of electronic display 1604) in a correct order (e.g., Left, Center, and Middle). Additionally, a user can assign the virtual window positions during set up. In some embodiments, a Bluetooth direction finding or location service is used. In other embodiments, a picture of the virtual windows that are part of a panorama is taken, and a smartphone app determines a distance and orientation relationship between the virtual windows. The information is sent to the code that splits the video stream into different video streams for each virtual window.

In embodiments, if a user decides to place two virtual windows on the same wall in a panorama with approximately 30-40 inches between virtual windows, the system assigns one virtual window the left position and the second one the right position to account for the physical space between each electronic display as shown in FIG. 16. Such placement provides an illusion of space between the virtual windows. For instance, if a horse rides by the left virtual window in a video, moving left to right, the horse would cross in front of the center virtual window, which in this case is not visible, but the time delay of not having the virtual window there simulates the horse moving in the space between the two virtual windows.

FIG. 17 illustrates an example configuration for a virtual window, in accordance with one or more embodiments. The example configuration shows an assembly for a virtual window. The assembly includes a casing 1704 configured to surround a frame 1712 of the virtual window. The casing 1704 can be rectangular, oval, rectangular with rounded corners, etc. The casing 1704 covers one or more processors. The configuration shown in FIG. 17 is of a recessed, "in wall" window with classic trim. The effect of the virtual window is enhanced if the window casing 1704, window sill 1708, apron, and sash look like an actual window. The embodiment shown in FIG. 17 is called an "in wall" version of a traditional window with a sill 1708, apron, and molding. The virtual window shown in FIG. 17 is known as "lv.classic." A window trim is used that mimics an actual window, including the use of acrylic to mimic glass from a window that has some of the same reflection properties as those of a glass window. A window grid, window muntins 1716, or mullions are an optional feature that can be placed between the acrylic and the electronic display.

Figure 19:
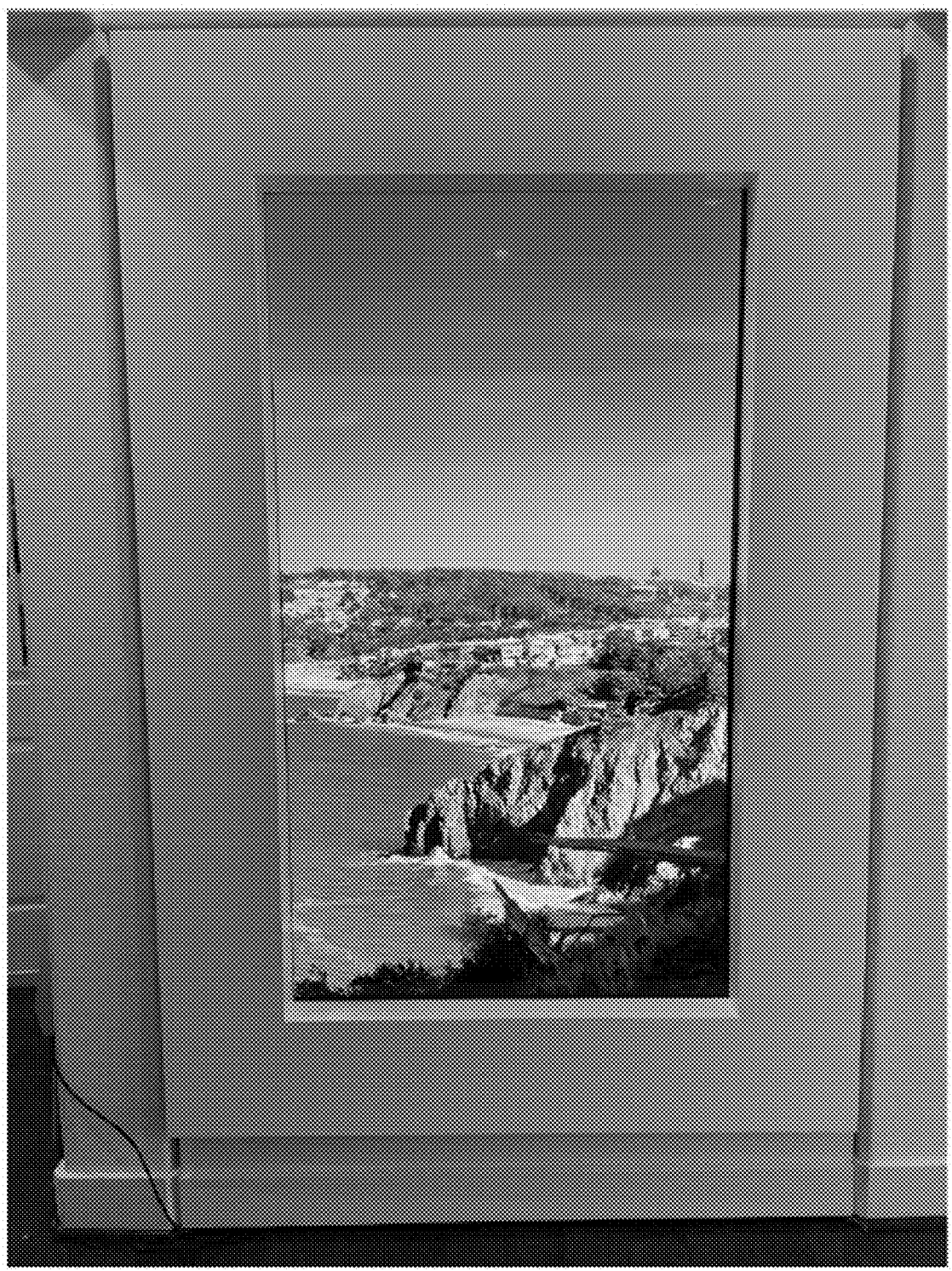
FIG. 19 illustrates an example configuration for a virtual window, in accordance with one or more embodiments.

In other embodiments as shown in FIG. 19, the virtual window 1512 is made to mimic a picture window of a solid piece of glass recessed in a wall, known as "lv.modern."

The casing 1704 is installed on a wall to seal a perimeter of the virtual window to the wall. One or more panes 1720 of glass or acrylic are attached to the casing 1704 and spaced from the virtual window by a particular separation. The separation is illustrated and described in more detail with reference to FIG. 20. The one or more panes 1720 are configured to permit a user located at a first location to view the virtual window through the one or more panes 1720. The panes 1720 provide first reflections of light to the user. One or more (optional) muntins 1716 or mullions are attached to the casing 1704 and configured to separate at least one pane of the one or more panes 1720 from at least another pane of the one or more panes 1720. The muntins 1716 support the one or more panes 1720 at the particular separation from the virtual window—see FIG. 20. In some embodiments, the virtual window includes overlay elements that simulate the closing of blinds, shades, or curtains. For example, an image composited into the video by the processors can include at least one of blinds, shades, or curtains. For example, the video can include a composited overlay of window blinds, shades, curtains etc. Realistic operation of such blinds, shades, and curtains can be accomplished by user gestures. Because the frame and blinds, etc., are composited with the view shown on the electronic display, the user can select from a library of window frame types, blinds, and other coverings. An example electronic display 10 and library 14 are illustrated and described in more detail with reference to FIG. 1.

In some embodiments, the electronic display is configured to be embedded in the wall and surrounded by the rectangular casing 1704. The electronic display is further configured to display the video and (optionally) a virtual frame to provide a virtual window for viewing by the user. Example processors 12 and a virtual frame 20 are illustrated and described in more detail with reference to FIG. 1. In some embodiments, the one or more processors receive a signal from at least one of a camera, a sensor, or a microphone located on a shelf or a window sill 1708 below the electronic display. The signal indicates a command from the user. The processors modify the video or the image based on the command. For example, the user can control certain aspects of the virtual window operation using gestures. In some embodiments, the user can use a computer interface (e.g., the user device 1504) and choose to view only sunsets, sunrises, or other specific features in multiple views that play for a fixed amount of time, and then move to another view. For instance, the user can choose to watch the 15 minutes before and after sunsets all over the world, and after a sunset in Bali is played, the electronic display 10 displays a sunset from Maui. The user can further choose a playlist of content to have in their virtual window, as someone would choose a playlist of music.

The frame 1712 can be placed around the display, e.g., to hide the display's bezel or for design if there is no bezel. In some embodiments, a small shelf or ledge 1708 is included at the bottom of the display. The sill 1708 can include sensors for gesture and/or voice control and can contain and conceal one or more speakers. The shelf or ledge 1708 can also include devices to provide haptic feedback to the user, or the haptic feedback devices or speakers can be in the display 10 itself. Example speakers 15, gesture control sensors 17, and haptic feedback devices 23 are illustrated and described in more detail with reference to FIG. 1. In embodiments, the physical sill or shelf 1708 affixed to the bottom of the display is a design accent that hides the speakers and gesture control sensors.

Figure 18:
FIG. 18 illustrates an example configuration for a virtual window, in accordance with one or more embodiments.

FIG. 18 illustrates an example configuration for a virtual window, in accordance with one or more embodiments. The configuration shown in FIG. 18 is of a recessed, "in wall" window with classic trim. Because each home is different, and a user can install their own window trim, sill, apron, sash, and grid and easily attach it to a window frame, a virtual window can be customized to match other windows already installed in the user's home or office. A generic window trim is also available. Both the generic window trim and a user's trim can also be painted to match a home or office in which a virtual window is to be installed.

FIG. 19 illustrates an example configuration for a virtual window, in accordance with one or more embodiments. The configuration shown in FIG. 19 is of a recessed, "in wall" window with modern trim. In some embodiments, a virtual window has no muntins, neither virtual nor actual. For example, the "Iv.modern" trim or configuration shown in FIG. 19 has no muntins. An "in wall" window can be recessed into a wall like an actual window to enhance the user experience. Having a virtual window recessed in a wall makes the virtual window appear more authentic like an actual window. Also, having it installed inside the wall also enables the hiding of power cables and other wiring, as well as a client device. A virtual window is readily removable from the wall for servicing without destroying the sheet rock or other aspects of the physical area around the virtual window.

Figure 20:
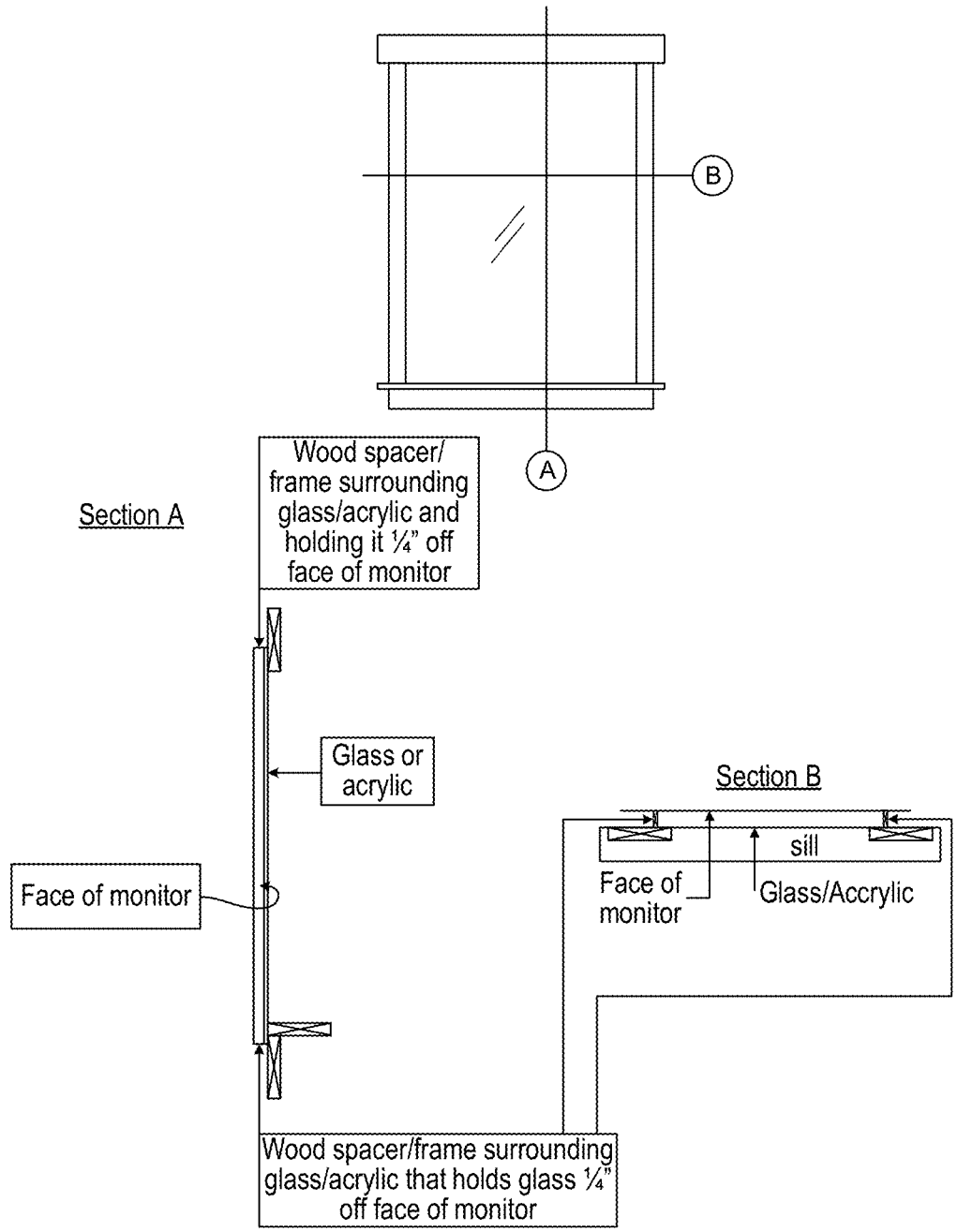
FIG. 20 illustrates an example configuration for a virtual window, in accordance with one or more embodiments.

FIG. 20 illustrates an example configuration for a virtual window, in accordance with one or more embodiments. FIG. 20 shows the relationship between an electronic display, a spacer, and a layer of acrylic or glass in a "classic" design trim, a window casing design, and assemblies. The design principles shown in FIG. 20 are the same as for a "modern" trim. The spacing between the display and the acyclic or glass layer varies between 0-0.5 inches depending on the location of the virtual window installation in a particular location. The acrylic or glass layer is held in place by the window casing assembly. The distance between the electronic display, acrylic or glass layer, and the window trim can be unique for each virtual window, as shown in FIG. 20.

Figure 21:
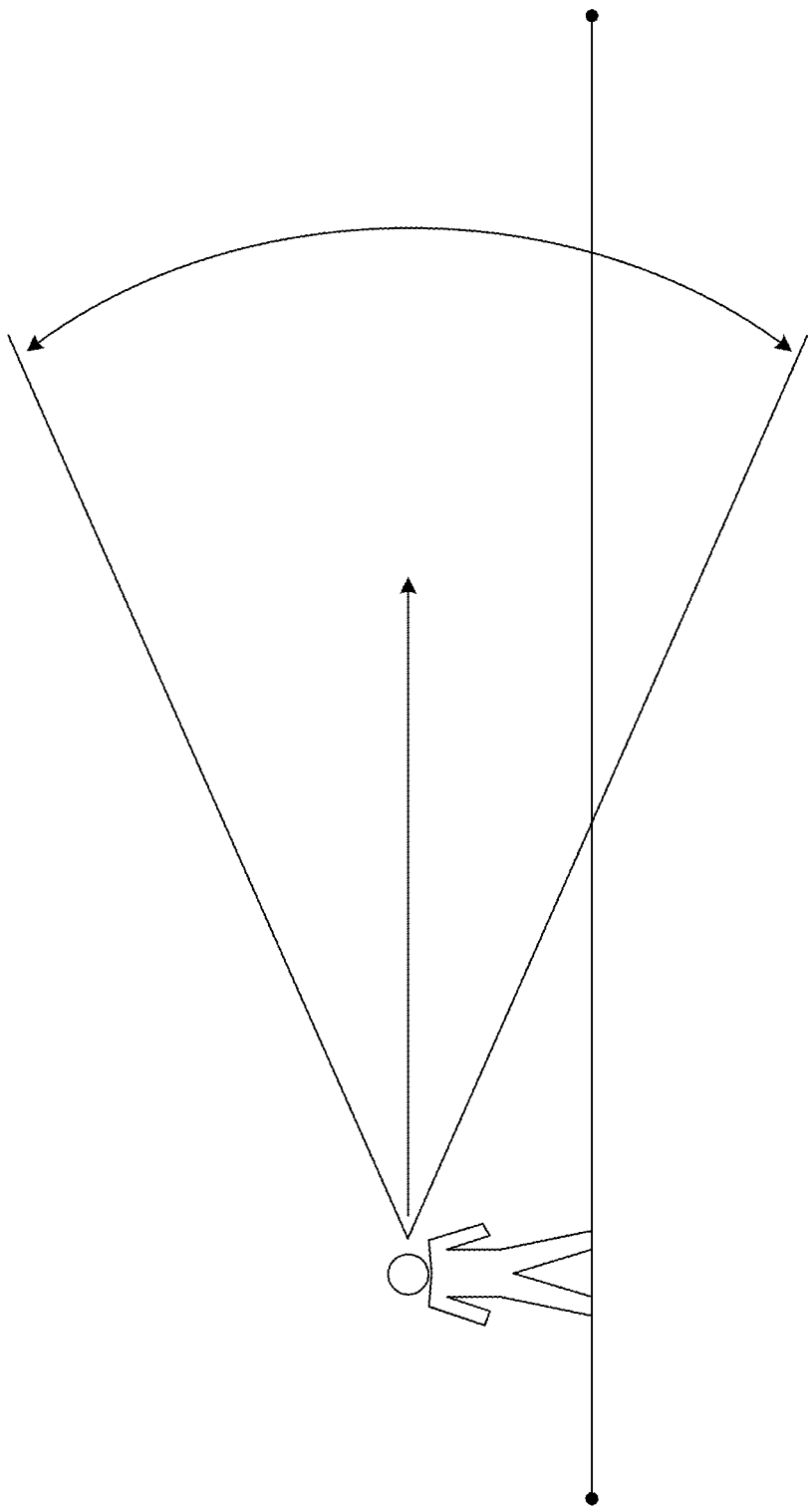
FIG. 21 illustrates an example field-of-view for a virtual window, in accordance with one or more embodiments.

FIG. 21 illustrates an example field-of-view for a virtual window, in accordance with one or more embodiments. The field-of-view is the extent of the observable world that is seen at any given moment. The field-of-view can be a solid angle or a three-dimensional analog of an angle, such as that subtended by a cone or formed by planes meeting at a point. It can be measured in steradians. In some embodiments, the virtual window views have the perspective of looking straight ahead, as actual windows are almost always perpendicular to the ground and the field-of-view expands equally in all directions. The virtual window can be positioned horizontally or vertically.

Figure 22:
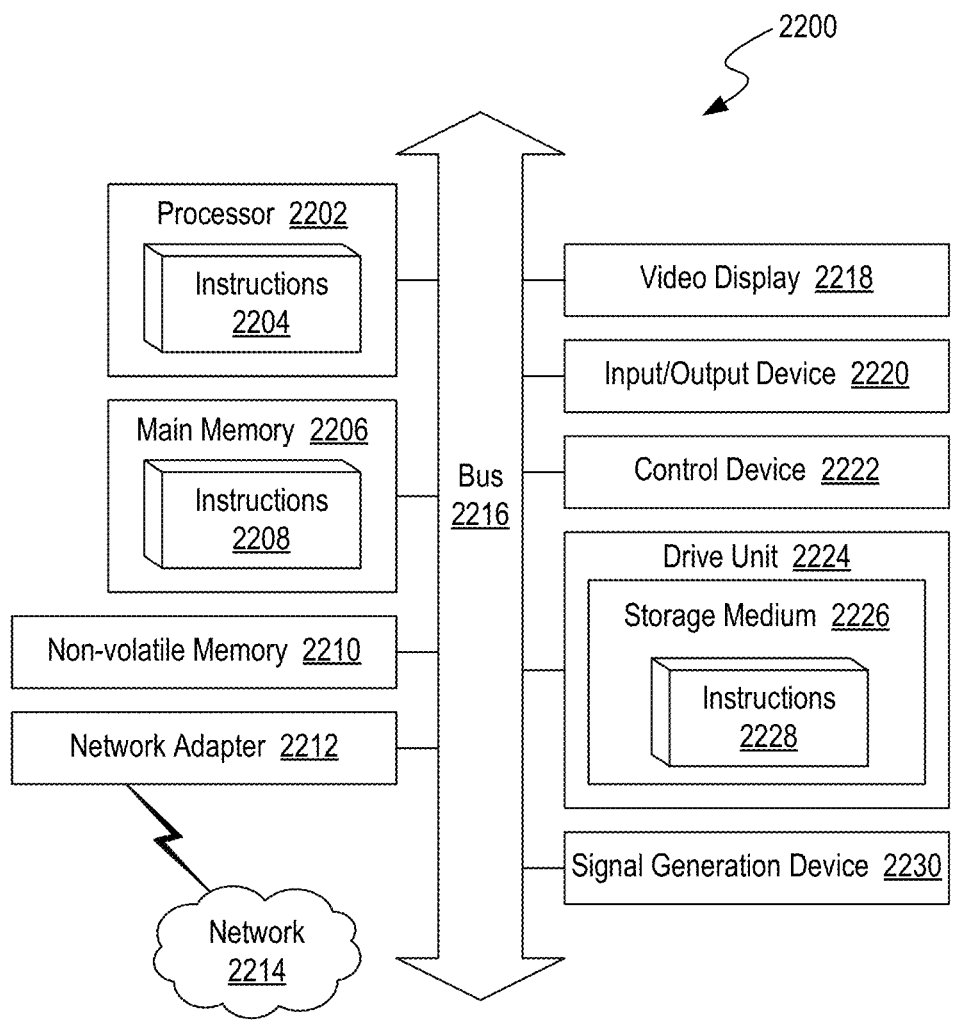
FIG. 22 is a block diagram illustrating an example computer system, in accordance with one or more embodiments.

FIG. 22 is a block diagram illustrating an example computer system 2200, in accordance with one or more embodiments. Components of the example computer system 2200 can be used to implement the systems illustrated and described in more detail with reference to FIGS. 1 and 15. At least some operations described herein can be implemented on the computer system 2200.

The computer system 2200 can include one or more central processing units ("processors") 2202, main memory 2206, non-volatile memory 2210, network adapter 2212 (e.g., network interface), video display 2218, input/output devices 2220, control device 2222 (e.g., keyboard and pointing devices), drive unit 2224 including a storage medium 2226, and a signal generation device 2230 that are communicatively connected to a bus 2216. The bus 2216 is illustrated as an abstraction that represents one or more physical buses and/or point-to-point connections that are connected by appropriate bridges, adapters, or controllers. The bus 2216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 2200 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 2200.

While the main memory 2206, non-volatile memory 2210, and storage medium 2226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2228. The term "machine-readable medium" and "storage medium" shall also be taken to include any medium that is capable of storing, encoding, or carrying a set of instructions for execution by the computer system 2200.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 2204, 2208, 2228) set at various times in various memory and storage devices in a computing device. When read and executed by the one or more processors 2202, the instruction(s) cause the computer system 2200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2210, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2212 enables the computer system 2200 to mediate data in a network 2214 with an entity that is external to the computer system 2200 through any communication protocol supported by the computer system 2200 and the external entity. The network adapter 2212 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2212 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

In alternative embodiments, compositing an image with a video includes analyzing, by the one or more processors, at least one of lighting, apparent color temperature, and content of the video. The processors adjust the lighting and apparent color temperature to the image, such that the illusion includes the casing being located at the second location.

In some embodiments, the image provides reflections of at least a portion of the view on the rectangular casing, the frame, and the one or more muntins.

In some embodiments, a hue of the casing changes as the time-of-day at the second location changes.

In some embodiments, the one or more processors track a perspective of the user relative to the electronic display. The one or more processors modify the video based on a change in the perspective.

In some embodiments, the perspective comprises a distance of the user from the electronic display and an angle at which the user is viewing the electronic display.

In some embodiments, tracking the perspective comprises eye tracking or facial tracking.

In some embodiments, the one or more processors receive a signal from at least one of a camera, a sensor, or a microphone located on a shelf or a window sill below the electronic display, the signal indicating a command from the user. The one or more processors modify the video or the image based on the command.

In some embodiments, the one or more processors provide a signal to a haptic feedback device located within the electronic display or on a shelf or a window sill below the electronic display. The signal instructs the haptic feedback device to provide haptic feedback to the user.

In some embodiments, the image comprises at least one of blinds, shades, or curtains.

In some embodiments, synchronizing the first length-of-day with the second length-of-day comprises increasing or decreasing, by the one or more processors, an amount of time a portion of the video is displayed on the electronic display.

In some embodiments, the one or more processors display a backup image on the electronic display responsive to detecting an interruption in transmitting the video to the electronic display located at the second location.

In some embodiments, the one or more processors store the video on a memory of the electronic display, wherein the one or more processors are located within the electronic display.

In some embodiments, the one or more processors are located remotely to the electronic display.

In some embodiments, the one or more processors send audio signals to a speaker located proximate to the electronic display. The speaker is to play ambient sounds associated with the video.

In some embodiments, the one or more processors augment the video with a photorealistic object or animated object for display in the view, wherein at least one feature of the photorealistic object or animated object is modified based on the time-of-view at the first location.

In some embodiments, augmenting the video comprises receiving, by the one or more processors, a clip comprising a portion of the video and the photorealistic object or animated object. The one or more processors insert the clip into the video at the time-of-view at the first location.

In some embodiments, a first amount of compression of the video matches a second amount of compression of the clip.

In some embodiments, the one or more processors detect that a user device of the user is connected to a wireless network, wherein the electronic display is connected to the wireless network. The one or more processors display an avatar of the user on the electronic display.

In some embodiments, synchronizing the first length-of-day with the second length-of-day comprises rewinding, by the one or more processors, a portion of the video responsive to the second length-of-day being longer than the first length-of-day. The one or more processors replay the portion of the video.

In some embodiments, the one or more processors generate a foreground object for display on the electronic display. The foreground object is to provide the illusion of the window in the first location to the user.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

What is claimed is:

1. An assembly for a virtual window, the assembly comprising:
   an electronic display mounted at a first location;
   a casing configured to:
      surround the electronic display; and
      seal a perimeter of the electronic display;
   one or more panes of glass or acrylic attached to the casing and spaced from the electronic display, the one or more panes configured to:
      permit the electronic display to be viewed through the one or more panes; and
      provide first reflections of light from the one or more panes onto the casing; and
   one or more processors configured to be covered by the casing, the one or more processors further configured to:
      be communicatively coupled to the electronic display;
      receive a video depicting a view of a second location;
      display second reflections of at least a part of the view onto the electronic display to provide a realistic illusion of a glass window;
      synchronize a time-of-view at the second location in the video with a time-of-day at the first location;
      synchronize a second length-of-day at the second location in the video with a first length-of-day at the first location by modifying the video based on sunrise and sunset times at the first and second locations; and
      display the video on the electronic display to provide the realistic illusion of a glass window.

2. The assembly of claim 1, wherein the electronic display is embedded in or mounted on a wall in a portrait or landscape configuration to match a layout of another window in the wall.

3. The assembly of claim 1, wherein the electronic display is configured to provide an illusion of viewing the second location through the virtual window.

4. The assembly of claim 1, wherein the one or more processors are configured to:
   synchronize the first length-of-day with the second length-of-day by modifying, by the one or more processors, an amount of time a portion of the video is displayed on the electronic display.

5. The assembly of claim 4, wherein the one or more processors are configured to modify the amount of time the portion of the video is displayed by inserting the portion of the video into the video at the electronic display one or more times.

6. The assembly of claim 1, wherein the one or more processors are further configured to:
   receive a command from at least one of a smartphone, a computer, or a controller, the command indicating a type of window frame; and
   retrieve the type of window frame from a library, wherein a virtual frame is generated to match the type of window frame.

7. The assembly of claim 1, wherein the one or more processors are further configured to:
   generate an image of a semi-transparent layer having dimensions matching the electronic display; and
   composite the image with the video to provide the realistic illusion of a glass window.

8. An apparatus comprising:
   an electronic display configured to be positioned in a first location;
   one or more panes of glass or acrylic configured to provide first reflections of light from the one or more panes onto a rectangular casing of the apparatus; and
   one or more processors electronically coupled to the electronic display and configured to:
      receive a video from a server, the video depicting a view of a second location and composited by the server to provide a realistic illusion of a glass window in the first location;
      display second reflections of at least a part of the view onto the electronic display;
      synchronize a time-of-view at the second location in the video with a time-of-day at the first location;
      synchronize a second length-of-day at the second location in the video with a first length-of-day at the first location by modifying the video based on sunrise and sunset times at the first and second locations; and
      transmit the video to the electronic display to provide the realistic illusion of a glass window.

9. The apparatus of claim 8, wherein the one or more processors are configured to:
   generate an image of the one or more panes of glass or acrylic attached to the casing, the one or more panes separated by one or more muntins; and
   composite the video with the image to provide the first reflections of light.

10. The apparatus of claim 9, wherein the image provides the second reflections of at least a part of the view onto the rectangular casing, a frame, and the one or more muntins.

11. The apparatus of claim 8, wherein the video is an animated three-dimensional (3D) model.

12. The apparatus of claim 8, wherein the electronic display is positioned in a portrait or landscape configuration to match a layout of another window in the first location.

13. The apparatus of claim 8, wherein the one or more processors are further configured to:
   augment a portion of the video with a photorealistic object or animated object for display in the view, wherein at least one feature of the photorealistic object or animated object is modified based on the time-of-view at the first location; and
   transmit the augmented portion of the video to the electronic display for viewing.

14. The apparatus of claim 8, wherein the one or more processors are further configured to:
   receive a command from at least one of a smartphone, a computer, or a controller, the command indicating a type of window casing; and
   retrieve the type of window casing from a library, wherein an image is generated to match the type of window casing.

15. A method comprising:
   receiving, by one or more processors, a pre-recorded video from a camera or a computer device, the pre-recorded video depicting a view of a first location;

synchronizing a time-of-view at a second location in the video with a time-of-day at the first location;

automatically modifying the pre-recorded video to synchronize a first length-of-day at the first location in the video with a second length-of-day at a second location based on sunrise and sunset times at the first and second locations;

generating, by the one or more processors, an image of a rectangular casing, a frame, and one or more muntins;

compositing, by the one or more processors, the image with the video to provide a realistic illusion of a glass window in the first location, the rectangular casing surrounding the window;

displaying first reflections of light from one or more panes of glass or acrylic onto the casing;

displaying second reflections of at least a part of the view in the video; and transmitting, by the one or more processors, the video to an electronic display located at the second location to provide the realistic illusion of a glass window.

16. The method of claim 15, wherein synchronizing the first length-of-day at the first location in the video with the second length-of-day at the second location comprises:

rewinding, by the one or more processors, a portion of the video responsive to the second length-of-day being longer than the first length-of-day; and replaying, by the one or more processors, the portion of the video.

17. The method of claim 16, wherein replaying the portion of the video is performed using a dissolve.

18. The method of claim 15, further comprising:

receiving, by the one or more processors, a command from at least one of a smartphone, a computer, or a controller, the command indicating a type of window casing; and retrieving, by the one or more processors, the type of window casing from a library, wherein the image is generated to match the type of window casing.

19. The method of claim 15, wherein the image is a first image, the method further comprising:

generating, by the one or more processors, a second image of a semi-transparent layer having dimensions matching the electronic display; and compositing, by the one or more processors, the second image with the video, to provide the realistic illusion of a glass window.

20. The method of claim 15, wherein the image is a first image, the method further comprising:

generating, by the one or more processors, a second image of the one or more panes of glass attached to the casing, the one or more panes separated by the one or more muntins; and compositing, by the one or more processors, the video with the second image to provide the first reflections of light.

\* \* \* \* \*